(12) United States Patent
Dudar

(10) Patent No.: US 10,997,805 B2
(45) Date of Patent: May 4, 2021

(54) METHODS AND SYSTEMS FOR DIAGNOSING AN ACTIVE ENGINE MOUNT CONDITION

(71) Applicant: Ford Global Technologies, LLC, Dearborn, MI (US)

(72) Inventor: Aed M. Dudar, Canton, MI (US)

(73) Assignee: Ford Global Technologies, LLC, Dearborn, MI (US)

(*) Notice: Subject to any disclaimer, the term of this patent is extended or adjusted under 35 U.S.C. 154(b) by 414 days.

(21) Appl. No.: 16/157,008

(22) Filed: Oct. 10, 2018

(65) Prior Publication Data
US 2020/0118367 A1 Apr. 16, 2020

(51) Int. Cl.
| | |
|---|---|
| *G07C 5/08* | (2006.01) |
| *F02D 17/04* | (2006.01) |
| *B60W 50/02* | (2012.01) |
| *F02D 41/22* | (2006.01) |
| *F02D 41/02* | (2006.01) |
| *B60W 10/06* | (2006.01) |

(52) U.S. Cl.
CPC .......... *G07C 5/0866* (2013.01); *B60W 10/06* (2013.01); *B60W 50/0205* (2013.01); *F02D 17/04* (2013.01); *F02D 41/0205* (2013.01); *F02D 41/22* (2013.01); *G07C 5/0825* (2013.01); *B60W 2050/021* (2013.01); *B60W 2420/42* (2013.01); *F02D 2041/228* (2013.01)

(58) Field of Classification Search
CPC ..... G07C 5/0866; G07C 5/0825; F02D 17/04; F02D 41/0205; F02D 41/22; F02D 2041/228; B60W 10/06; B60W 50/0205; B60W 2420/42; B60W 2050/021
See application file for complete search history.

(56) References Cited

U.S. PATENT DOCUMENTS

| | | | |
|---|---|---|---|
| 7,042,345 B2 | 5/2006 | Ellis | |
| 8,296,103 B2 | 10/2012 | Son et al. | |
| 9,153,079 B1 | 10/2015 | Wood | |
| 9,994,226 B2 | 6/2018 | Dudar | |
| 10,830,668 B2 * | 11/2020 | Wall | ....................... G01H 1/003 |
| 2015/0100221 A1 | 4/2015 | Routledge et al. | |

FOREIGN PATENT DOCUMENTS

DE 102010013339 * 1/2011 ........... B60K 5/1283

OTHER PUBLICATIONS

A. W. Andika et al, Natural Logarithm-based Sliding Mode Control for Two DOF Active Engine Mounting System, IEEE International Conference on Instrumentation, Communication, Information Technology and Biomedical Engineering 2009, Nov. 23-25, 2009, pp. 1-4.*

* cited by examiner

*Primary Examiner* — Russell Frejd
(74) *Attorney, Agent, or Firm* — Geoffrey Brumbaugh; McCoy Russell LLP

(57) ABSTRACT

In one or more embodiments, during a stopped condition of the vehicle, commanding stiffening and dampening modes of an active engine mount (AEM) system while inducing vehicle vibrations and recording images. In this way, a condition of the AEM system may be indicated based on the recorded images.

20 Claims, 12 Drawing Sheets

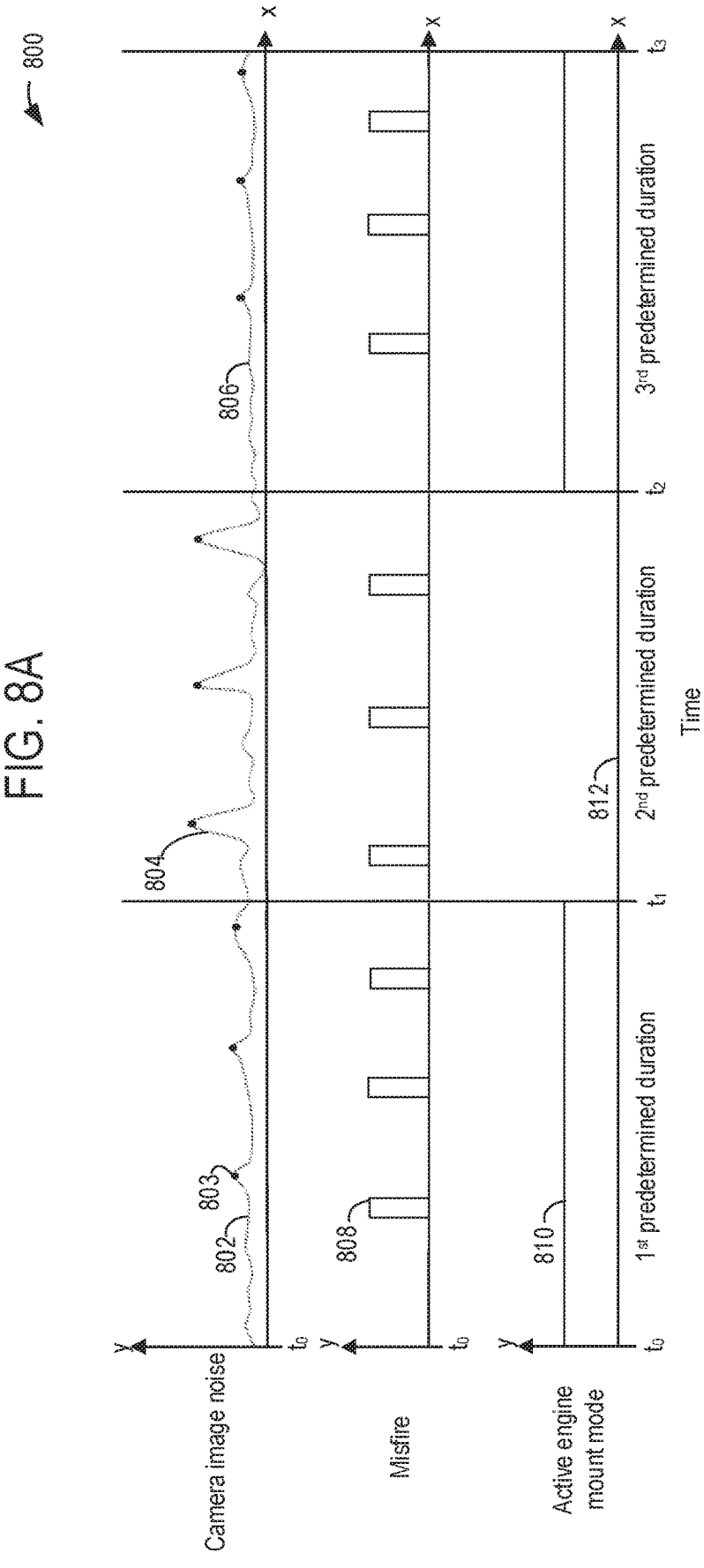
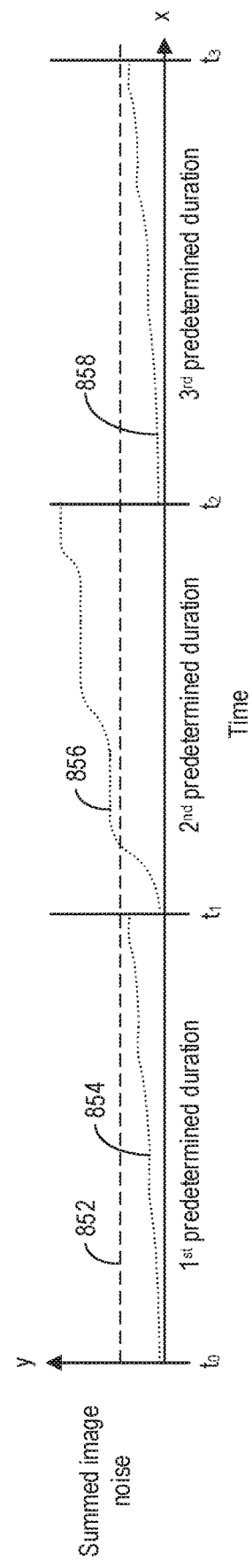

Recorded vibration patterns above threshold difference?

| | 1st duration (1102) | 2nd duration (1104) | 3rd duration (1106) | Diagnosis |
|---|---|---|---|---|
| A | No | Yes | No | Active mounts functioning as desired |
| B | No | No | No | Active mounts stuck in first mode |
| C | Yes | Yes | Yes | Active mounts stuck in second mode |

METHODS AND SYSTEMS FOR DIAGNOSING AN ACTIVE ENGINE MOUNT CONDITION

FIELD

The present description relates generally to methods and systems for diagnosing an active engine mount coupled to an engine.

BACKGROUND/SUMMARY

Engines historically have had solid rubber mounts to isolate engine vibration from the vehicle cabin and chassis, where the rubber naturally absorbed vibrations from the engine. However, in performance and high end cars, if rubber is too compliant, then certain vehicle maneuvers may cause high loads, and this may stress joints in the vehicle, for example in the exhaust system. Hence, tunable active engine mounts (AEMs) have been developed that may be controlled to change dampening characteristics depending on engine load.

As an example, the AEMs may be configured to be soft (e.g. dampening mode) at engine idle to absorb undesired vibrations. However, at higher engine speeds, the AEMs may be configured to stiffen (e.g. stiffening mode), to limit undesired engine motion, which may prevent stress on exhaust joints, for example. Accordingly, AEMs may achieve low noise, vibration, and harshness (NVH) at idle, and may further reduce NVH and prevent undesired stress at high loads.

However, over time, the AEMs may degrade due to AEM aging, for example. As a result, the undesired engine vibrations may not be absorbed as effectively. Further, if the undesired vibration is not appropriately absorbed/dampened, engine performance may be reduced, which may include reduced fuel economy and a decrease in engine efficiency, for example. Moreover, in cases where a vehicle may be an autonomous vehicle (AV) or where the vehicle may be part of a rideshare program, there may not be a person available to take note of NVH that may be an indication of AEM degradation or people utilizing the vehicle may be one-time riders who do not have a direct responsibility for addressing AEM degradation. Thus, such AEM degradation may go unreported and unaddressed, and excessive vibrations from a failed engine mount may cause damage to peripheral subsystems that interact with the engine that are costly for an owner, such as a rideshare company to repair. As just one example, damage to the exhaust system may occur due to excessive vibrations from a failed engine mount.

Previous approaches to monitor AEM degradation may have included the use of dedicated vibration sensors configured to monitor vehicle chassis vibration as part of a diagnostic routine to evaluate a condition of the AEMs. However, the inclusion of such sensors may be costly and may be a barrier to retrofitting vehicles to carry out such a routine for evaluating a condition of the AEMs. Furthermore, degradation of one or more of such vibration sensors may go undetected, which may thus potentially lead to inaccurate diagnostic results should the diagnostic routine for evaluating the condition of the AEM degradation be carried out with one or more degraded sensors.

The inventors herein have recognized these issues, and have developed systems and methods to at least partially address the above issues. In one example, the issues described above may be addressed by, during a stopped condition of the vehicle, commanding stiffening and dampening modes of an AEM system while inducing vehicle vibrations and recording images, and indicating a condition of the AEM system based on the recorded images.

In this way, onboard cameras of the vehicle may be leveraged to perform additional functions, which may result in cost savings and simplifying a process for retrofitting vehicles to carry out the approach disclosed herein. Additionally, the onboard cameras are sensitive to even minor vibration, resulting in camera image jitter that is particularly useful for diagnosing AEM degradation. Further, the onboard cameras of the vehicle may be robust for performing the diagnostic routine, as the onboard cameras are uniquely mounted at a front of the engine and are a solid state device which results in minimal degradation to the onboard cameras. Moreover, via the approach disclosed herein, the technical effect of diagnosing a condition of the AEMs, even if the vehicle is unoccupied, may be achieved.

It should be understood that the summary above is provided to introduce in simplified form a selection of concepts that are further described in the detailed description. It is not meant to identify key or essential features of the claimed subject matter, the scope of which is defined uniquely by the claims that follow the detailed description. Furthermore, the claimed subject matter is not limited to implementations that solve any disadvantages noted above or in any part of this disclosure.

BRIEF DESCRIPTION OF THE DRAWINGS

FIG. 8A shows a graphical representation of results for a first example AEM system diagnostic routine, according to one or more embodiments of the present disclosure.

FIG. 8B shows a graphical representation of summed image noise of the first example AEM system diagnostic routine, according to one or more embodiments of the present disclosure.

FIG. 11 shows an example AEM system diagnostic results reference table, according to one or more embodiments of the present disclosure.

DETAILED DESCRIPTION

Figure 1:
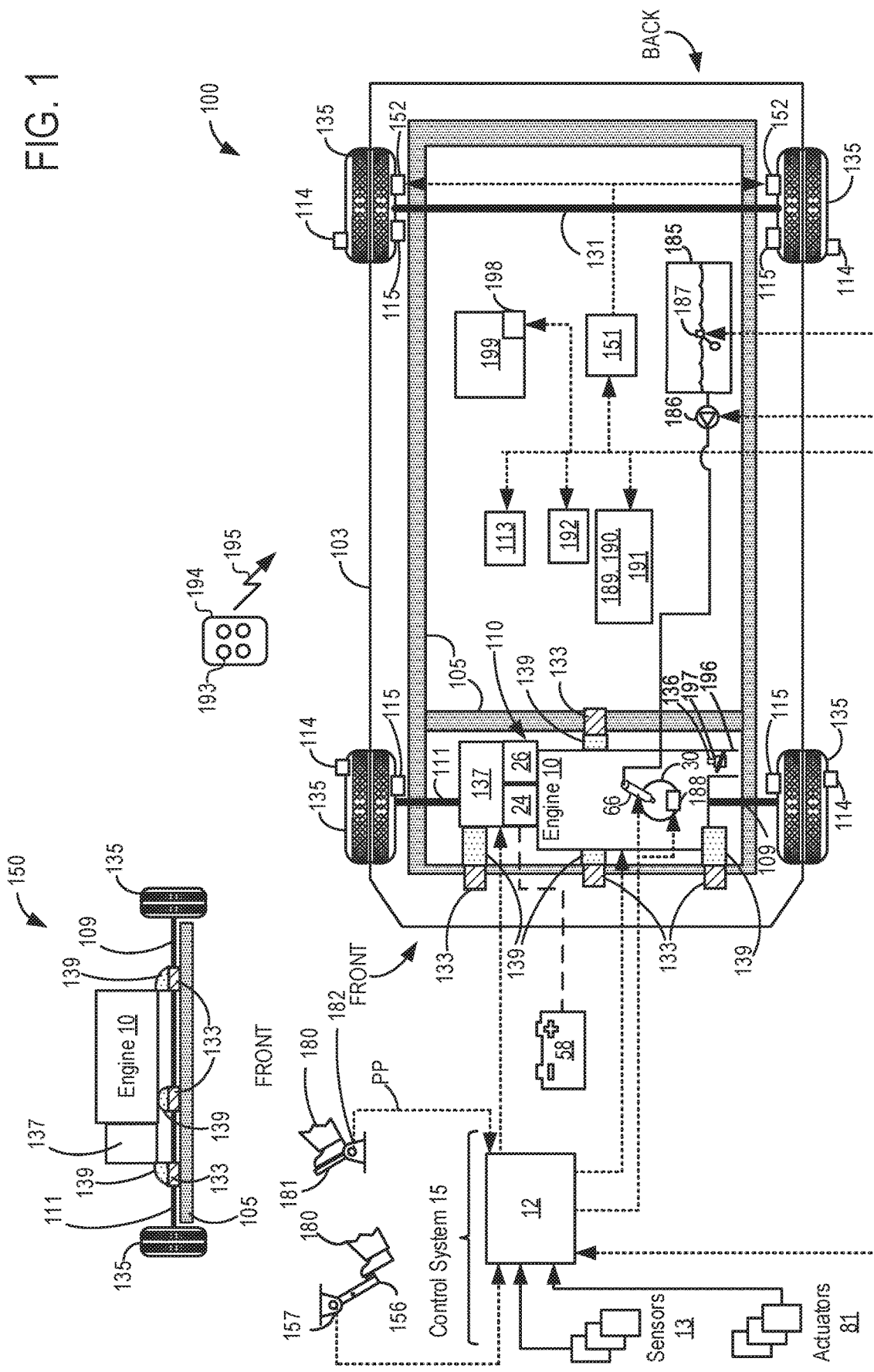
FIG. 1 illustrates an example vehicle powertrain including one or more AEMs, according to one or more embodiments of the present disclosure.
Figure 2:
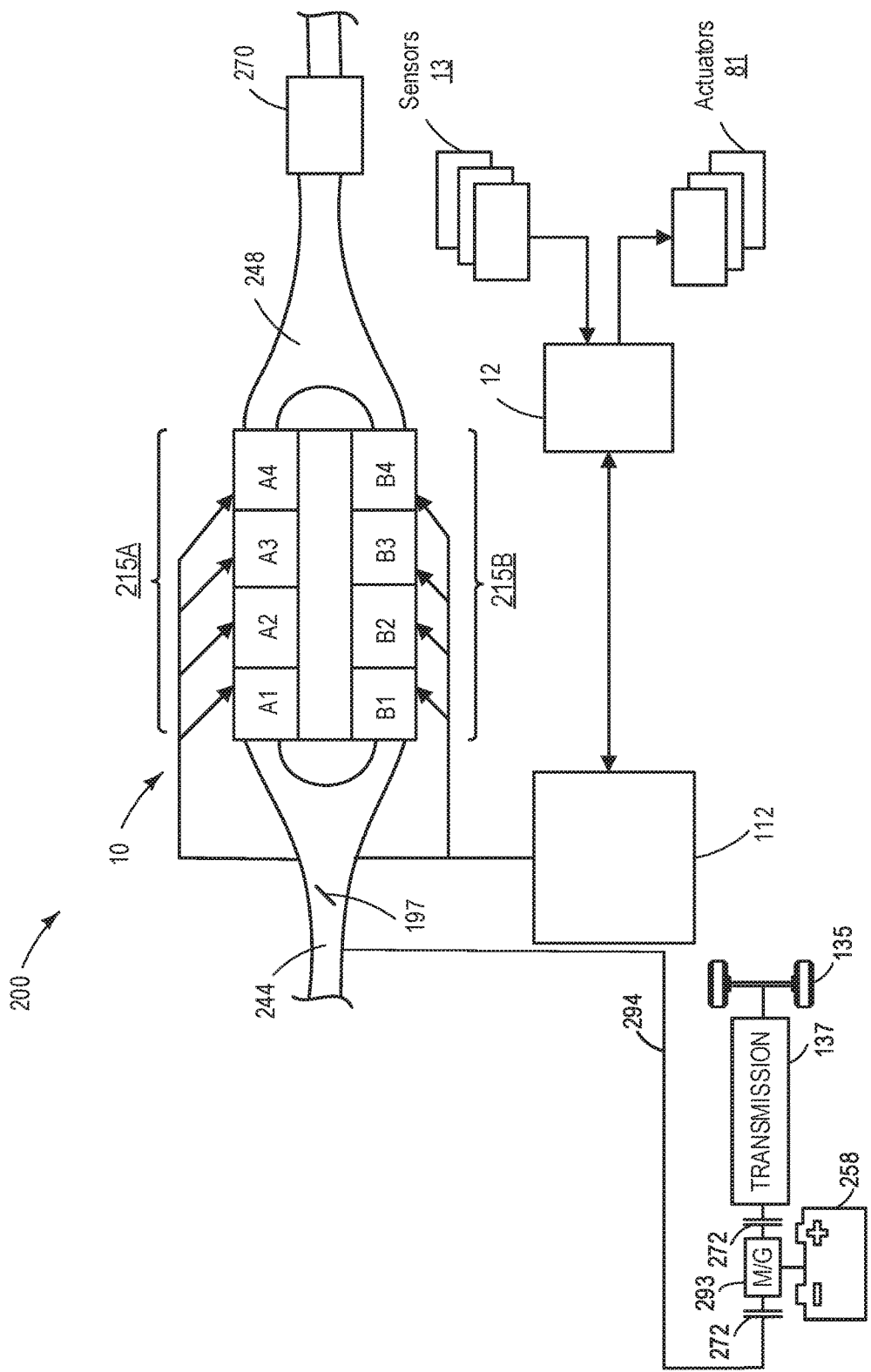
FIG. 2 shows an example schematic layout of a variable displacement engine (VDE) of the vehicle powertrain of FIG. 1, according to one or more embodiments of the present disclosure.
Figure 9A:
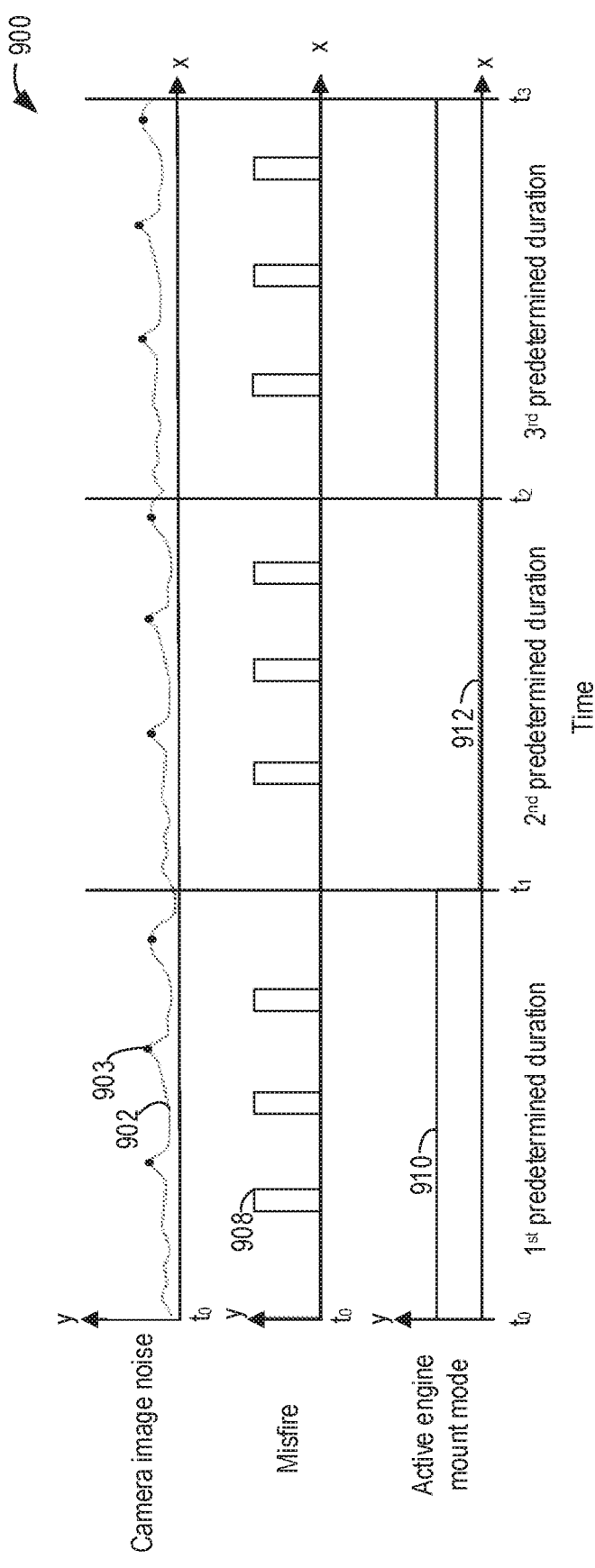
FIG. 9A shows a graphical representation of results for a second example AEM system diagnostic routine, according to one or more embodiments of the present disclosure.
Figure 9B:
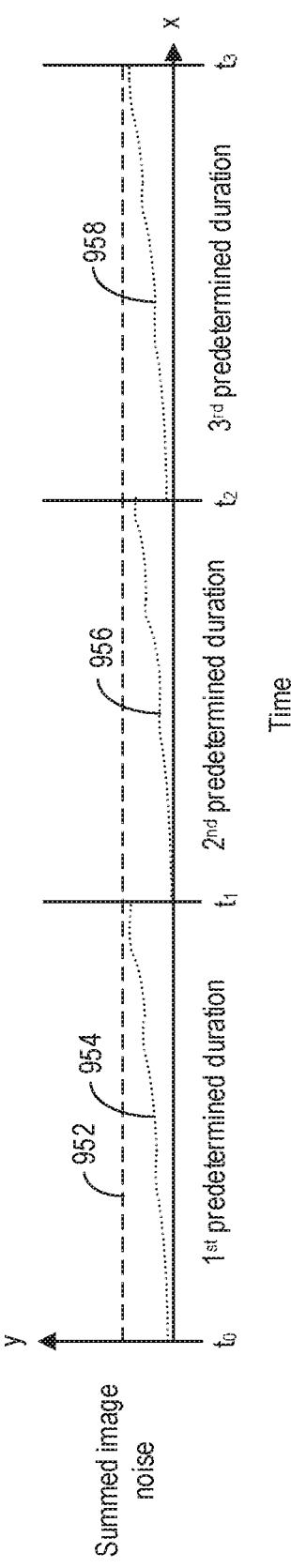
FIG. 9B shows a graphical representation of summed image noise for the second example AEM system diagnostic routine, according to one or more embodiments of the present disclosure.
Figure 10A:
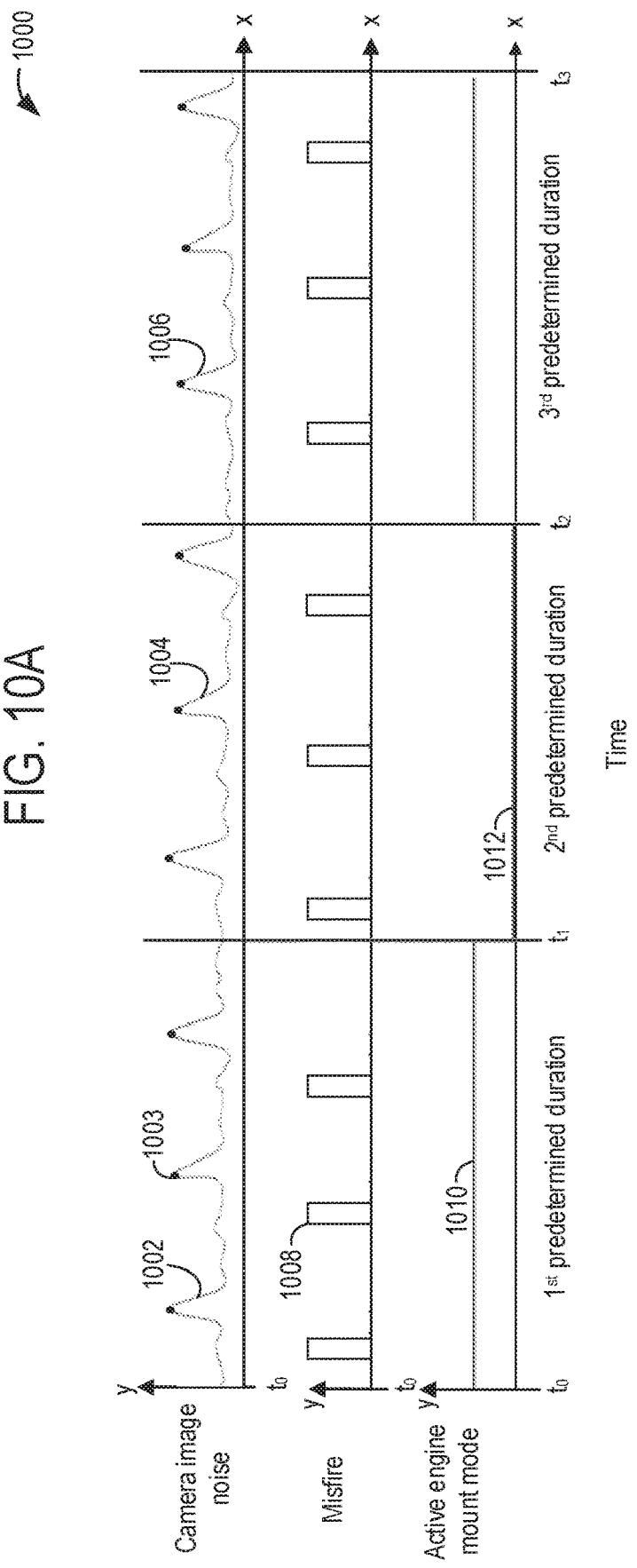
FIG. 10A shows a graphical representation of results for a third AEM system diagnostic routine, according to one or more embodiments of the present disclosure.
Figure 10B:
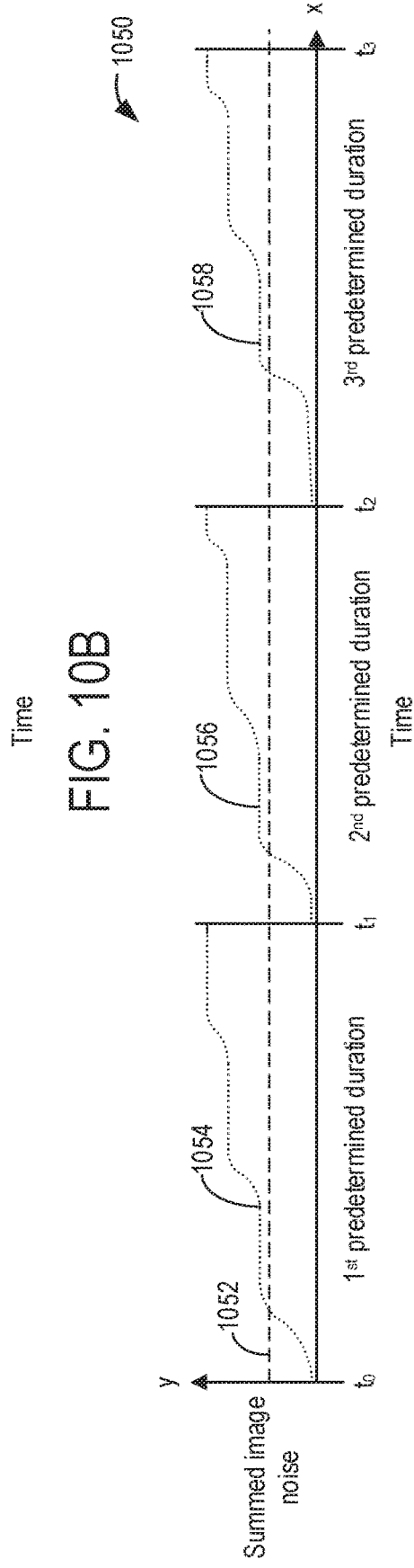
FIG. 10B shows a graphical representation of summed image noise for the third example AEM system diagnostic routine, according to one or more embodiments of the present disclosure.

The following description relates to systems and methods for diagnosing an AEM coupled to an engine. In at least one example, the AEMs, such as those shown in FIGS. 3-4 may be part of a vehicle as shown at FIGS. 1-2 and FIG. 5, where the vehicle includes a monitoring system comprising one or more onboard cameras. In one or more examples, as shown at least at FIG. 6, entry conditions for performing an AEM system diagnostic routine may be confirmed, and then one or more onboard cameras may be used to establish a baseline still image. The diagnostic routine may further include commanding the AEM to either enter a stiffening mode or a dampening mode, and then inducing periodic vibrations while capturing images via one or more of the onboard cameras, as described at FIG. 12. In some cases, camera settings may be transitioned from a first setting to a second setting via the controller, and the controller may make one or more adjustments to the camera for calibration purposes, as described at FIG. 13. Based on a level of vibration-induced noise indicated in the camera images while the AEM is commanded to the stiffening mode and the dampening mode, a presence or absence of AEM degradation may be indicated. Specifically, a method for performing image subtraction as part of an AEM system diagnostic routine is shown at FIG. 7. FIGS. 8A and 8B depict example results for an example AEM system diagnostic where the diagnostic indicates an absence of degradation. FIGS. 9A and 9B depict example results for an example AEM system diagnostic where the diagnostic indicates that the AEM system is stuck in a dampening mode of operation. FIGS. 10A and 10B depict results for an example AEM system diagnostic routine where the AEM is stuck in a stiffening mode. FIG. 11 depicts an example lookup table that may be used to determine whether the AEM is functioning as desired, or is stuck in the dampening or stiffening mode Referring to FIG. 1, an example embodiment of a vehicle system 100 is shown from a top view. Vehicle system 100 comprises a vehicle body 103 with a front end, labeled "FRONT", and a back end labeled "BACK." Vehicle system 100 may include a plurality of wheels 135. For example, as shown in FIG. 1, vehicle system 100 may include a first pair of wheels adjacent to the front end of the vehicle and a second pair of wheels adjacent the back end of the vehicle.

In some examples, vehicle system 100 may be a hybrid vehicle system with multiple sources of torque available to one or more vehicle wheels 135. In one example, vehicle system 100 may be a full hybrid system, wherein the vehicle is driven by only the engine and generator cooperatively, or only the electric motor, or a combination. Alternatively, assist or mild hybrid embodiments may also be employed, wherein the engine is the primary source of torque and the electric motor selectively adds torque during specific conditions, such as during a tip-in event. In some examples, vehicle system 100 may be an autonomously driven car.

In the example shown, vehicle system 100 includes an internal combustion engine, such as engine 10, coupled to transmission 137. Engine 10 and transmission 137 may herein be referred to in combination as a vehicle powertrain 110 or a powertrain 110. The powertrain 110 may be configured in various manners including as a parallel, a series, or a series-parallel hybrid vehicle. It will be appreciated that other vehicle components coupled to one or more of engine and/or transmission 137 may also be included in the vehicle powertrain 110 without departing from the scope of the present invention. For example, engine 10 may include an engine intake 196 and an engine exhaust (not shown). Engine intake may include a throttle 197, for controlling an amount of intake air to engine 10. In one example, throttle 197 may be controlled electronically via a controller, such as controller 12. In another example, throttle 197 may be mechanically coupled to an accelerator pedal 181.

In the depicted example, transmission 137 may be a gearbox, a planetary gear system, or another type of transmission. Transmission 137 may further include an electric generator 24 and an electric motor 26. The electric generator 24 and the electric motor 26 may also be referred to as electric machines as each may operate as either a motor or a generator. Torque is output from transmission 137, for propelling vehicle wheels 135, via power transfer gearing (not shown), a torque output shaft (not shown), and differential-and-axle assembly (not shown).

Generator 24 is driveably connected to electric motor 26 such that each of electric generator 24 and electric motor 26 may be operated using electric energy from an electrical energy storage device, herein depicted as battery 58. In some embodiments, an energy conversion device, such as an inverter, may be coupled between the battery and the motor to convert the DC output of battery into an AC output for use by motor. However, in alternate embodiments, the inverter may be configured in the electric motor. Electric motor 26 may be operated in a regenerative mode, that is, as a generator, to absorb energy from vehicle motion and/or the engine and convert the absorbed kinetic energy to an energy form suitable for storage in battery 58.

Vehicle system 100 is depicted as having a front wheel drive (FWD) transmission where engine 10 drives the front wheels via half shafts 109 and 111. In another embodiment, vehicle system 100 may have a rear wheel drive (RWD) transmission which drives the rear wheels via a driveshaft (not shown) and a differential (not shown) located on rear axle 131. In still other examples, vehicle system 100 may include a four wheel drive transmission.

Engine 10 and transmission 137 may be supported at least partially by frame 105, or chassis, which in turn may be supported by plurality of wheels 135. As such, vibrations and movements from engine 10 and transmission 137 may be transmitted to frame 105. Frame 105 may also provide support to a body of vehicle system 100 and other internal components such that vibrations from engine operation may be transferred to an interior, or cabin, of vehicle system 100. In order to reduce transmission of vibrations to the interior, or cabin, of vehicle system 100, engine 10 and transmission 137 may be mechanically coupled via a plurality of members 139 to respective AEMs 133. As discussed herein, AEMs may refer to any type of AEM that may change its dampening characteristics. For example, such an active engine mount may be controlled or adjusted to be relatively soft (e.g., to dampening mode) at engine idle to absorb undesired vibration, but may be controlled or adjusted to stiffen (e.g., to stiffening mode) at higher engine speeds and loads to limit undesired engine motion. As one example, engine manifold vacuum may be selectively applied to an AEM in order to change the characteristics of the AEM. Such an example will be discussed in greater detail with regard to FIG. 4. Thus, AEMs as discussed herein may refer to vacuum-regulated engine mounts, active motor mounts that counter engine vibration by commanding a counter shake to reduce intensity of engine vibration, magneto rheological mounts which may contain small particles of iron suspended in liquid such that when an electric current or magnetic field is applied to the fluid, the iron particles line up and effectively increase viscosity of the fluid, etc.

As depicted, engine 10 and transmission 137 are mechanically coupled at four locations to members 139 and via members 139 to four AEMs 133. In other alternate embodiments, a different number of members and AEMs may be used, without departing from the scope of the present disclosure.

View 150 depicts a view of vehicle system 100 as observed from the front end of vehicle system 100. Control system 15 including controller 12 may at least partially control engine 10 as well as vehicle system 100. The controller 12 receives signals from the various sensors 13 of FIG. 1 and employs the various actuators 81 of FIG. 1 to adjust engine operation based on the received signals and instructions stored on a memory of the controller. As an example, vehicle system 100 may include sensors dedicated to indicating the occupancy-state of the vehicle, for example seat load cells 189, door sensing technology 190, and/or onboard cameras 191.

In some examples control system 15 may be in communication with a remote engine start receiver 192 (or transceiver) that receives wireless signals 195 from a key fob 194 having a remote start button 193. In other examples (not shown), a remote engine start may be initiated via a cellular telephone, or smartphone based system where a user's cellular telephone sends data to a server and the server communicates with the vehicle to start the engine.

Control system 15 and controller 12 may send control signals to actuators 81 which may include fuel injector 66 coupled to cylinder 30 in addition to other actuators of engine 10 and transmission 137 not depicted at FIG. 1. For illustrative purposes, only one cylinder 30 and one fuel injector 66 are shown. However, it may be understood that engine 10 may include a plurality of cylinders, and a plurality of fuel injectors. In some embodiments, each cylinder of engine 10 may include a spark plug 188 for initiating combustion. Control system 15 may provide an ignition spark to cylinder 30 via spark plug 188 in response to a spark advance signal from a controller, under select operating modes. However, in some embodiments, spark plug 188 may be omitted, such as where engine 10 may initiate combustion by auto-ignition or by injection of fuel as may be the case with some diesel engines. Further, engine 10 may be a multi-cylinder engine capable of operation in variable displacement engine (VDE) mode, as will be described in greater detail with reference to FIG. 2.

Vehicle system 100 may include one or more fuel storage tanks 185 for storing fuel on-board the vehicle. For example, fuel storage tank 185 may store one or more liquid fuels, including but not limited to: gasoline, diesel, and alcohol fuels. In some examples, the fuel may be stored on-board the vehicle as a blend of two or more different fuels. For example, fuel storage tank 185 may be configured to store a blend of gasoline and ethanol (e.g., E10, E85, etc.) or a blend of gasoline and methanol (e.g., M10, M85, etc.), whereby these fuels or fuel blends may be delivered to engine 10. Still other suitable fuels or fuel blends may be supplied to engine 10, where they may be combusted at the engine to produce an engine output. The engine output may be utilized to propel the vehicle, for example.

In some embodiments, control system 15 may receive an indication of the level of fuel stored at fuel storage tank 185 via a fuel level sensor 187, also referred to herein as fuel level indicator (FLI) 187. The level of fuel stored at fuel storage tank 185 (e.g., as identified by the fuel level sensor 187) may be communicated to the vehicle operator, for example, via a fuel gauge or indication in a vehicle instrument panel (not shown).

Fuel storage tank 185 may be coupled to a fuel pump system 186. The fuel pump system 186 may include one or more pumps for pressurizing fuel delivered to the injectors of engine 10, such as the example injector 66 shown. As discussed, while only a single injector 66 is shown, additional injectors are provided for each cylinder. As depicted, fuel level sensor 187 may comprise a float connected to a variable resistor. Alternatively, other types of fuel level sensors may be used.

Controller 12 may receive input data from the various sensors, process the input data, and trigger the actuators in response to the processed input data based on instruction or code programmed therein corresponding to one or more routines. In one example, controller 12 may be a conventional microcomputer which includes: a central processing unit (CPU), an input/output (I/O) ports, a read-only memory (ROM), a random access memory (RAM), a keep alive memory (KAM), and a conventional data bus. Controller 12 may receive various signals from sensors coupled to powertrain 110, including image data signals from one or more cameras of a monitoring system; signals from one or more radar sensors of the monitoring system; pressure sensor data signals and/or accelerometer data signals from an occupant monitoring system; measurement of inducted mass air flow (MAF) from mass air flow sensor (not shown); engine coolant temperature (ECT) from temperature sensor coupled to cooling sleeve (not shown); a profile ignition pickup signal (PIP) from Hall effect sensor (not shown) coupled to crankshaft (shown in FIG. 2); and throttle position TP from throttle position sensor 136 and an absolute Manifold Pressure Signal MAP from sensor (not shown). Engine speed signal RPM is generated by controller 12 from signal PIP in a conventional manner and manifold pressure signal MAP from a manifold pressure sensor provides an indication of vacuum, or pressure, in the intake manifold. During stoichiometric operation, this sensor can give an indication of engine load. Further, this sensor, along with engine speed, can provide an estimate of charge (including air) inducted into the cylinder. In one example, engine speed sensor may produce a predetermined number of equally spaced pulses every revolution of the crankshaft. The controller 12 may receive signals from the various sensors of FIG. 1 and may employ the various actuators of FIG. 1, such as throttle 197, fuel injectors 66, spark plug 188, etc., to adjust engine operation based on the received signals and instructions stored on a memory of the controller.

In another example, engine 10 may be controlled at least partially by control system including controller 12 and by input from a vehicle operator 180, or an autonomous controller via an input device 181. In one example, input device 181 includes an accelerator pedal and an accelerator pedal position sensor 182 for generating a proportional pedal position signal PP. Similarly, control system 15 may receive an indication of an operator requested vehicle braking via a human operator 180, or an autonomous controller.

For example, control system 15 may receive sensory feedback from brake pedal position sensor 157 which communicates with brake pedal 156. In some examples, vehicle system 100 may include an antilock brake system (ABS) 113. The ABS may include wheel speed sensors 114, for example. The ABS may further include at least two hydraulic valves (not shown) within the brake hydraulics (not shown). Controller 12 may monitor rotational speed of each wheel, and responsive to detection of a wheel rotating significantly slower than the others, the ABS 113 may be controlled to reduce hydraulic pressure to the brake 115 at the affected wheel, thus reducing the braking force on said wheel. Alternatively, responsive to detection of a wheel rotating significantly faster than the others, the ABS 113 may be controlled to increase hydraulic pressure to the brake at the affected wheel, thus increasing the braking force on said wheel. In still further cases, as will be discussed in detail below, ABS 113 may command an increased brake pressure at one or more wheels in order to conduct an AEM test diagnostic procedure. Herein, increasing brake pressure at one or more wheels via ABS 113 may be referred to as activating one or more wheel brakes. For example, ABS 113 may activate one or more wheel brakes in order to stiffen the vehicle frame and couple it mechanically to the engine, to conduct an AEM diagnostic routine, as will be elaborated with respect to FIGS. 6-7.

In one example, the autonomous controller may include a user interface device, a navigation system, at least one autonomous driving sensor, and an autonomous mode controller, as discussed in more detail at FIG. 5. The user interface device may be configured to present information to vehicle occupants, under conditions wherein a vehicle occupant may be present. However, it may be understood that the vehicle may be operated autonomously in the absence of vehicle occupants, under certain conditions. The presented information may include audible information or visual information. Moreover, the user interface device may be configured to receive user inputs. In some possible approaches, the user interface device may include a touch-sensitive display screen. The navigation system may be configured to determine a current location of the vehicle using, for example, a Global Positioning System (GPS) receiver configured to triangulate the position of the vehicle relative to satellites or terrestrial based transmitter towers. The navigation system may be further configured to develop routes from the current location to a selected destination, as well as display a map and present driving directions to the selected destination via, for example, the user interface device. The autonomous driving sensors may include any number of devices configured to generate signals that help navigate the vehicle. Examples of autonomous driving sensors may include a radar sensor, a lidar sensor, a vision sensor (e.g. a camera), vehicle to vehicle infrastructure networks, or the like. The autonomous driving sensors may enable the vehicle to "see" the roadway and vehicle surroundings, and/or negotiate various obstacles while the vehicle system 100 is operating in autonomous mode. The autonomous driving sensors may be configured to output sensor signals to, for example, the autonomous mode controller.

In another example, the autonomous mode controller may be configured to control one or more subsystems while the vehicle is operating in the autonomous mode. Examples of subsystems that may be controlled by the autonomous mode controller may include a brake subsystem, a suspension subsystem, a steering subsystem, and a powertrain subsystem. The autonomous mode controller may control any one or more of these subsystems by outputting signals to control units associated with subsystems. In one example, the brake subsystem may comprise an anti-lock braking subsystem, configured to apply a braking force to one or more of wheels (e.g. wheels 135). Discussed herein, applying the braking force to one or more of the vehicle wheels may be referred to as activating the brakes. To autonomously control the vehicle, the autonomous mode controller may output appropriate commands to the subsystems. The commands may cause the subsystems to operate in accordance with the driving characteristics associated with the selected driving mode. For example, driving characteristics may include how aggressively the vehicle accelerates and decelerates, how much space the vehicle leaves behind a front vehicle, how frequently the autonomous vehicle changes lanes, etc.

Vehicle system 100 may further include an air conditioning (A/C) system 199, which may include an A/C compressor 198. In some examples, the A/C compressor and A/C system may be electronically controlled via, for example, controller 12. However, in other examples, A/C compressor 198 may be mechanically controlled, via, for example, being coupled to an engine crankshaft (shown in FIG. 2).

Vehicle system 100 may further include an electronic parking brake system 151. Electronic parking brake system may be utilized in conjunction with the vehicle controller, to engage, or release, electronic parking brake(s) 152, for example.

With regard to vehicle system 100, noise, vibration, and harshness (NVH) may arise during engine operation, transmission operation, during transitions in engine operating modes, etc. Additionally, NVH may arise as a result of driving over rough (e.g., uneven) surfaces. AEMs 133 may be designed to dampen vehicle noise and vibrations across a broad range of frequencies, or alternatively may be designed to dampen specific ranges of vibrational frequencies. In this way, NVH arising from a number of different sources may each be dampened by a common AEM 133.

AEMs 133 may be operatively coupled to controller 12 and upon receiving a signal from controller 12 may adapt their damping characteristics to neutralize vibrations arising from the engine and/or transmission. In one example, changes to damping characteristics may be obtained by active damping via changing effective mount stiffness. In another example, damping characteristics may be varied by active damping via actuated masses that can create a counterforce to a perceived vibration. Herein, AEMs may filter vibrations received from the engine and/or transmission, and provide a counterforce that will nullify vibrations that were not filtered. For example, AEMs 133 may be controlled via controller 12, to a first configuration, or first mode (e.g., dampening mode), for idle operation, and to a second configuration, or mode (e.g., stiffening mode), for operating at higher engine speeds and loads. As will be discussed in further detail below with regard to FIG. 6, an AEM diagnostic routine may be periodically conducted in order to ascertain whether the AEMs are functioning as desired.

As described above, FIG. 1 shows only one cylinder of a multi-cylinder engine. As such each cylinder may similarly include its own set of intake/exhaust valves, fuel injector(s), spark plug, etc. Any number of cylinders and a variety of different cylinder configurations may be included in engine 10, e.g., V-6, I-4, I-6, V-12, opposed 4, and other engine types.

Turning now to FIG. 2, a schematic diagram of multi-cylinder engine system 200 capable of operating in variable displacement engine (VDE) mode is shown. Multi-cylinder engine system 200 may include engine 10 of FIG. 1, for example. It will be appreciated that engine system components introduced in FIG. 1 are numbered similarly and not reintroduced.

In the depicted example, engine 10 is a V8 engine with the first cylinder bank 215A and second cylinder bank 215B, each having four cylinders, cylinders A1-A4 in cylinder bank 215A and cylinders B1-B4 in cylinder bank 215B, respectively. Cylinders A1-A4 of cylinder bank 215A and cylinders B1-B4 of cylinder bank 215B may include selectively deactivatable intake valves (not shown) and selectively deactivatable exhaust valves (not shown). The cylinder valves may be deactivated via hydraulically actuated lifters, or via a cam profile switching (CPS) mechanism in which a cam lobe with no lift is used for deactivated valves. Other mechanisms for valve deactivation may also be used. Engine 10 has an intake manifold 244, with throttle 197, and an exhaust manifold 248 coupled to an emission control system 270. Emission control system 270 may include one or more catalysts and air-fuel ratio sensors (not shown).

Vehicle system 200 may be a hybrid vehicle with multiple sources of torque available to one or more vehicle wheels 135. In the example shown, vehicle system 200 may include an electric machine 293. Electric machine 293 may be a motor (e.g. same as 26) or a motor/generator. Crankshaft 294 of engine 10 and electric machine 293 are connected via a transmission 137 to vehicle wheels 135 when one or more clutches 272 are engaged. In the depicted example, a first clutch is provided between crankshaft 294 and electric machine 293, and a second clutch is provided between electric machine 293 and transmission 137. Controller 12 may send a signal to an actuator of each clutch 272 to engage or disengage the clutch, so as to connect or disconnect crankshaft 294 from electric machine 293 and the components connected thereto, and/or connect or disconnect electric machine 293 from transmission 137 and the components connected thereto. Transmission 137 may be a gearbox, a planetary gear system, or another type of transmission. The powertrain may be configured in various manners including as a parallel, a series, or a series-parallel hybrid vehicle.

Electric machine 293 receives electrical power from a traction battery 258 to provide torque to vehicle wheels 135. Electric machine 293 may also be operated as a generator to provide electrical power to charge traction battery 258, for example during a braking operation. In some examples, battery 258 may be the same as the battery 58 depicted above at FIG. 1. Alternatively, traction battery 258 may be different than energy storage device 58.

During selected conditions, such as when the full torque capability of the engine is not needed, one or more cylinders in a first cylinder bank 215A and a second cylinder bank 215B may be selected for deactivation (herein also referred to as a VDE mode of operation). This may include selectively deactivating one or more cylinders on only the first bank 215A, one or more cylinders on only the second bank 215B, or one or more cylinders on each of the first and second bank. The number and identity of cylinders deactivated on each bank may be symmetrical or asymmetrical. Specifically, one or more cylinders of the selected group of cylinders may be deactivated by shutting off respective fuel injectors while maintaining operation of the intake and exhaust valves such that air may continue to be pumped through the cylinders. While fuel injectors of the disabled cylinders are turned off, the remaining enabled cylinders continue to carry out combustion with fuel injectors active and operating. To meet the torque requirements, the engine produces the same amount of torque on those cylinders for which the injectors remain enabled. In other words, the remaining active cylinders are operated at higher average cylinder loads. This requires higher manifold pressures, resulting in lowered pumping losses and increased engine efficiency. Also, the lower effective surface area (from only the enabled cylinders) exposed to combustion may reduce engine heat losses, which may thus improve the thermal efficiency of the engine.

In one example, based on a drop in torque demand, one or more cylinders may be selectively deactivated. Further, cylinders may be grouped for deactivation based on their position along the engine block, on an engine bank, by ignition firing order, as well as their deactivation history. As one example, cylinders from the different cylinder banks (e.g., cylinder banks 215A and 215B) may be grouped together for deactivation. For example, during a first VDE condition, cylinders A1, B1, A4 and B4 may be deactivated while during a second VDE condition, cylinders A2, B2, A3 and B3 may be deactivated. In an alternate example, the first VDE pattern may contain a different identity and number cylinders than the second VDE pattern.

Engine 10 may operate on a plurality of substances, which may be delivered via fuel system 112. Engine 10 may be controlled at least partially by a control system including controller 12. Controller 12 may receive various signals from sensors 13 coupled to engine 10, and send control signals to various actuators 81 coupled to the engine and/or vehicle. In addition, controller 12 may receive an indication of cylinder knock or pre-ignition from one or more knock sensors distributed along the engine block. When included, the plurality of knock sensors may be distributed symmetrically or asymmetrically along the engine block. Further, the one or more knock sensors may include accelerometers, ionization sensors or in cylinder pressure transducers.

Figure 3:
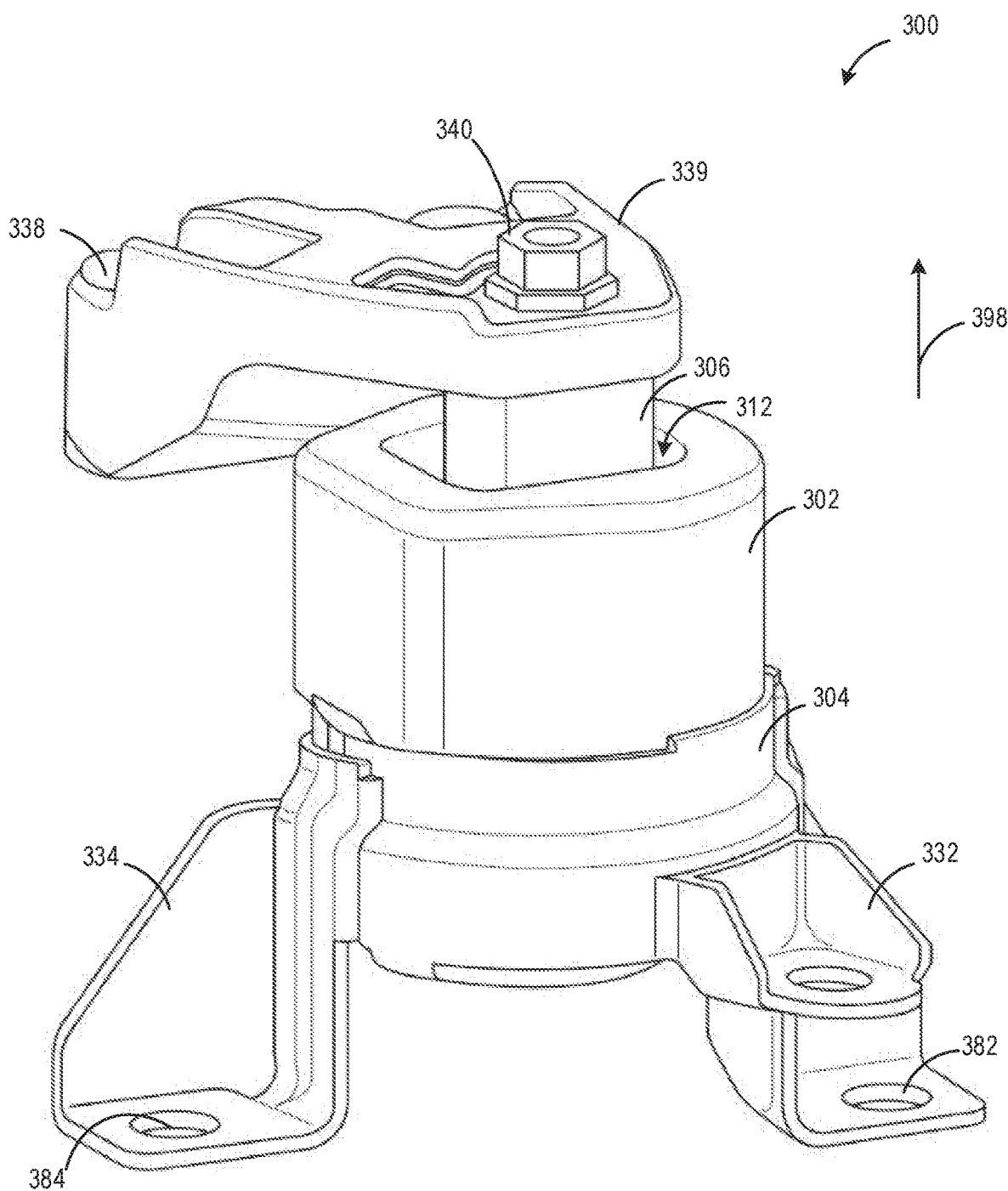
FIG. 3 shows an external view of an example AEM coupled to the vehicle powertrain of FIG. 1, according to one or more embodiments of the present disclosure.

Turning now to FIG. 3, an external view of an example AEM 300 is shown. It may be understood that such an example is meant to be illustrative, and is not meant to be limiting. AEM 300 may be an example of AEM 133 shown within vehicle system 100 of FIG. 1. When configured in a vehicle system that is on flat ground (e.g., vehicle system 100 at FIG. 1), AEM 300 may be oriented in a substantially vertical direction. However, in other configurations, AEM 300 may be oriented at an oblique angle relative to vertical. As used herein, however, the terms "upper" and "lower" may refer to respective ends of arrow 398, which indicates a directional axis specific to the AEM. That is to say, arrow 398 provides reference for a relative positioning of components constituting AEM 300, and not a reference for the orientation of AEM 300 within a vehicle system. Additionally, an upper end of the AEM may refer to the end closer toward the head of arrow 398 and a lower end of the AEM may refer the end closer toward the tail of arrow 398.

AEM 300 includes an upper external housing 302 with a central opening 312 formed within a top surface thereof. Upper external housing 302 may be formed from a rigid material, such as a metal or hard plastic. Central opening 312 is configured to receive a fastener or bolt 306, which extends outwardly from a first elastomeric member or main rubber element (not shown, but see FIG. 4) for fastening to a component of the vehicle powertrain (e.g., engine 10 of FIG. 1). Bolt 306 may be formed from a rigid material such as steel or aluminum.

An upper end of bolt 306 may be configured to rotate about the clearance of central opening 312, while the lower end (not shown) may be lodged in a first elastomeric member of the AEM, and as such the lower end of the bolt may remain relatively stationary compared to the upper end of the bolt. In another example, bolt 306 may extend outwardly from a bearing member (not shown) that is partially encapsulated within the first elastomeric member of the housing, and may be configured to transfer vibrations to the first elastomeric member via the bearing member.

Bolt 306 may be coupled to a rigid upper bracket 339 via a fastener 340. It will be appreciated that upper bracket 339 may be similar to a member 139 described in FIG. 1. Upper bracket 339 may be formed from one of a metal or a hard plastic. A distal portion 338 of the upper bracket 339 may be coupled to a vehicle powertrain component (e.g., coupled to the powertrain component at a flange affixed thereto) via a fastener, in a manner generally known in the art.

Lower external housing 304 may be fastened (e.g., mechanically coupled) to upper housing 302. Lower external housing 304 may be formed from a rigid material such as one of a metal or hard plastic. A coupling of the lower housing to a vehicle frame (e.g., 105 at FIG. 1) may be achieved via a plurality of lower brackets. In this way, the external housing may remain structurally rigid (e.g., substantially non-compressible), and any vibrations absorbed from the vehicle powertrain or vehicle frame may be transferred to the first elastomeric member within the external housing, said first elastomeric member configured to dampen the vibrations.

Shown in FIG. 3 are first lower bracket 332 and second lower bracket 334. It will be appreciated that still further brackets may be affixed to lower external housing 304 in a similar manner to first lower bracket 332 and second lower bracket 334 without departing from the scope of the invention. The lower brackets may be formed from metal, such as steel. However, other materials may be used to form the lower brackets without departing from the scope of the present invention. First lower bracket 332 is shown integrally formed with lower external housing 304. A bolt (not shown) may couple (e.g., mechanically) first lower bracket 332 to a vehicle frame via hole 382. Second lower bracket 334 is shown affixed to, but not integrally formed with, lower external housing 304, and may similarly be coupled to the vehicle frame via hole 384.

Figure 4:
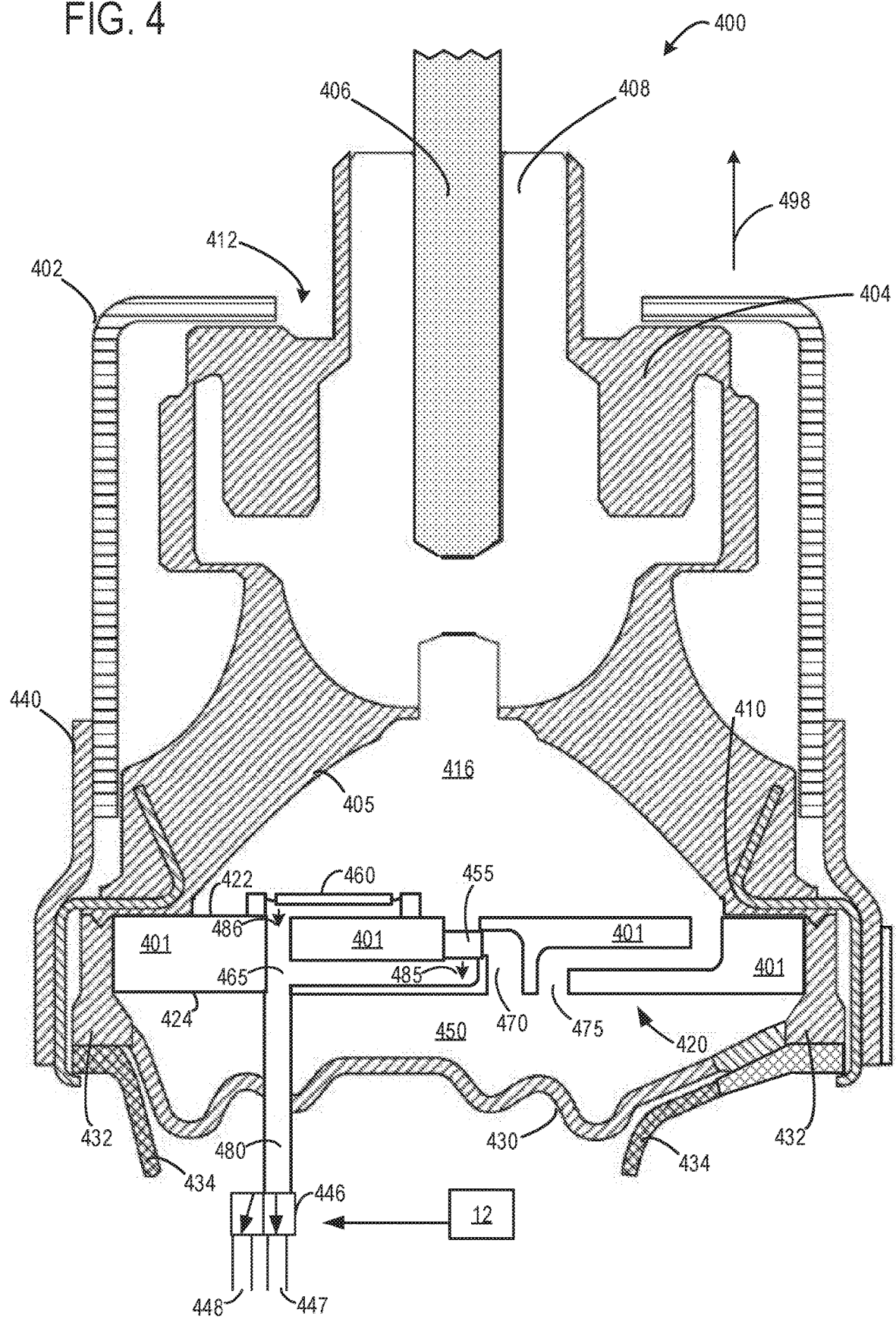
FIG. 4 shows a cross-sectional view of an example AEM, including a partitioning structure and decoupler element, according to one or more embodiments of the present disclosure.
Figure 5:
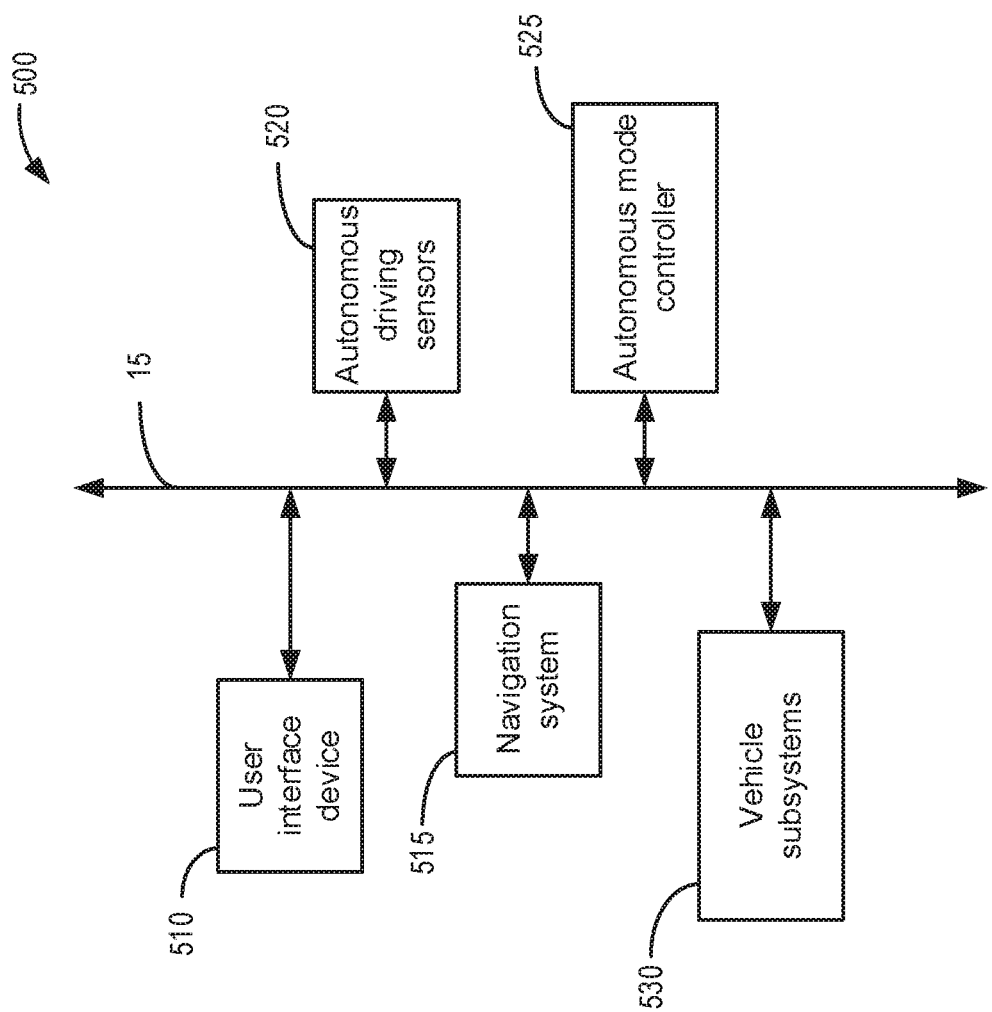
FIG. 5 schematically illustrates a block diagram of an example system for an autonomous vehicle.

FIG. 4 shows a cross-sectional view 400 of an AEM (e.g., same as AEM 133 of FIG. 1). It may be understood that the AEM depicted at FIG. 4 is meant to be illustrative, and is not meant to be limiting. As used herein, the terms "upper" and "lower" may refer to respective ends of arrow 498. It will be appreciated that arrow 498 may provide a reference for the relative positioning of components within the AEM.

The AEM assembly may include an external housing 402 (e.g., similar to upper external housing 302 of FIG. 3) dimensioned to receive a first elastomeric member 404 that is generally shaped as a truncated cone, and primarily made of an elastomeric material, such as an elastic rubber as is conventional in the art. A bolt 406 (e.g., similar to bolt 306 at FIG. 3) extends outwardly from the first elastomeric member for fastening to the powertrain or engine (not shown) in a manner generally known in the art. In the depicted example, bolt 406 with a metal bearing member 408 of which at least a lower portion encapsulated within the first elastomeric member 404. In addition, a lower peripheral portion of the first elastomeric member may include a stiffener, such as metallic stiffener 410, molded within the first elastomeric member to add rigidity and support. In this way, vibrations and/or displacements from the powertrain may be transferred to the first elastomeric member 404 of the AEM.

As discussed above with regard to FIG. 3, the first elastomeric member is received within the upper external housing 402 so that the bolt 406 extends through a central opening 412 in the restrictor. The lower surface 405 of the first elastomeric member 404 forms a portion of a first or upper fluid chamber 416, namely a high pressure side, of the engine mount. First fluid chamber 416 may be filled with a hydraulic fluid (e.g., glycol). The remainder of the first fluid chamber 416 is defined by the inertia track assembly 420. It may be understood that inertia track assembly 420 may herein also be referred to as a partitioning structure. An outer portion of an upper surface of the partitioning structure (denoted by reference numeral 422) abuttingly and sealingly engages the first elastomeric member 404 in order to seal the first fluid chamber 416. A second outer portion of the partitioning structure along the lower surface denoted by reference numeral 424 is sealingly engaged by a second elastomeric member 430 (a rubber boot or diaphragm) and particularly an upper peripheral portion 432 thereof. Lower surface 424 of the partitioning structure 420, in combination with second elastomeric member 430, form a second or lower fluid chamber 450. Second fluid chamber may too be filled with a hydraulic fluid (e.g., glycol). The second elastomeric member 430 is protected by a diaphragm cover 434, preferably formed of a more rigid material than the elastomeric diaphragm, and that matingly engages (e.g., mechanically couples to) the lower external housing 440. When the lower external housing 440 is fastened to the upper housing, the lower peripheral edge of the first elastomeric member 404 and the peripheral portion 432 of the second elastomeric member sealingly engage opposite sides or faces 422, 424, respectively, of the partitioning structure 420.

The partitioning structure and operation of a typical active engine mount 400 will be briefly described. As indicated, the first fluid chamber 416 and the second fluid chamber 450 are fluidly coupled together by partitioning structure 420. Partitioning structure 420 comprises a channel plate 401, a decoupler 460 (e.g., compliant membrane), a first fluid track 470 (e.g., idle track), a second fluid track 475 (e.g. ride track), and a vacuum chamber 465. Vacuum chamber 465 may be coupled to the partitioning structure such that the vacuum chamber may defined by passageways in the channel plate 401, and wherein a segment of the vacuum chamber is defined by decoupler 460. Vacuum chamber 465 may be fluidly connected to a source of either vacuum, or atmospheric pressure, via conduit 480. Vacuum may be provided by any available source of vehicle vacuum, for example intake manifold vacuum, to the vacuum chamber 465 via a vacuum line (not shown). A solenoid valve (e.g., a three-way solenoid valve) may control the amount of vacuum within the vacuum line. In one example, a first pressure 447 (e.g. atmospheric pressure), or a second pressure 448 (e.g. vacuum) may be applied to vacuum chamber 465, via controlling two-way valve 446. For example, controller 12, may command two-way valve 446 to enable the first pressure, or the second pressure, to be communicated to vacuum chamber 465, depending on vehicle operating conditions, as will be discussed in further detail below. More specifically, controller 12 may send a signal to two-way valve 446 to actuate the valve to either couple first pressure 447 to vacuum chamber 465, or to couple second pressure 448 to vacuum chamber 465.

When vacuum chamber 465 is at atmospheric pressure (e.g., a first pressure), decoupler 460 may be free to move. Furthermore, when vacuum chamber 465 is at atmospheric pressure, a first vacuum actuated valve 455 is seated in an upper position within channel plate 401 such that the first fluid track 470 is closed. When in such a configuration, the decoupler 460 may breathe in response to vibrations or displacements, and fluid flow between first fluid chamber 416 and second fluid chamber 450 may only be allowed via the second fluid track 475. As such, active engine mount 400 typifies decoupled engine mount function when vacuum chamber 465 is at atmospheric pressure. Such a configuration of AEM 400 may be termed a second, or stiffening mode of AEM operation.

Alternatively, application of vacuum to vacuum chamber 465 may serve to seat decoupler 460 against channel plate 401, indicated by arrow 486, and furthermore may position first vacuum actuated valve in a lower position, indicated by arrow 485. As such, first fluid track 470 is opened, and decoupler 460 is not permitted to move, or breathe. Accordingly, fluid flow between first fluid chamber 416 and second fluid chamber 450 occurs via the first fluid track 470, as first fluid track 470 represents the path of least resistance through the inertia track assembly 420, thus providing a soft engine mount for idle mode operation. In other words, with vacuum chamber 465 coupled to second pressure 448 (e.g. vacuum), AEM 400 may be understood to be operating in a first, or dampening mode of AEM operation.

Further, controller 12 may be configured to monitor vibrational frequencies and amplitude generated by vehicle powertrain (e.g. powertrain 110 of FIG. 1). As an example, when a relatively low frequency is produced (e.g., low amplitude torque pulses during engine idle condition), the controller may apply vacuum to vacuum chamber 465, such that the AEM is operating in the first, dampening mode. In another example, when a high frequency vibration is detected (e.g., during rapid acceleration and/or high engine load condition), the controller may apply a first, atmospheric pressure to vacuum chamber 465, such that the AEM is operating in the second, stiffening mode. In this way, the AEM may isolate the broad range of vibrational frequencies and amplitudes generated by the vehicle powertrain under different engine operating modes.

FIGS. 3 and 4 show example configurations with relative positioning of the various components. If shown directly contacting each other, or directly coupled, then such elements may be referred to as directly contacting or directly coupled, respectively, at least in one example. Similarly, elements shown contiguous or adjacent to one another may be contiguous or adjacent to each other, respectively, at least in one example. As an example, components laying in face-sharing contact with each other may be referred to as in face-sharing contact. As another example, elements positioned apart from each other with only a space therebetween and no other components may be referred to as such, in at least one example. As yet another example, elements shown above/below one another, at opposite sides to one another, or to the left/right of one another may be referred to as such, relative to one another. Further, as shown in the figures, a topmost element or point of element may be referred to as a "top" of the component and a bottommost element or point of the element may be referred to as a "bottom" of the component, in at least one example. As used herein, top/bottom, upper/lower, above/below, may be relative to a vertical axis of the figures and used to describe positioning of elements of the figures relative to one another. As such, elements shown above other elements are positioned vertically above the other elements, in one example. As yet another example, shapes of the elements depicted within the figures may be referred to as having those shapes (e.g., such as being circular, straight, planar, curved, rounded, chamfered, angled, or the like). Further, elements shown intersecting one another may be referred to as intersecting elements or intersecting one another, in at least one example. Further still, an element shown within another element or shown outside of another element may be referred as such, in one example.

As mentioned earlier, engine 10 (of FIGS. 1-2) may be operated in VDE mode or non-VDE (all cylinder firing) mode. Further, a portion of an engine's cylinders may be disabled during selected conditions, where the selected conditions can be defined by parameters such as an engine speed/load conditions. In addition, a controller may disable selected cylinders through the sealing of the cylinder's intake and exhaust valves. Noise, vibration and harshness (NVH) issues may arise during transitions in engine operating modes from VDE mode to non-VDE mode, and vice versa, and in order to provide fuel economy benefits along with reduced NVH, engine 10 may be primarily operated in either an even firing three-cylinder or an even firing VDE mode, for example. In another example, transitioning between VDE mode and non-VDE mode may involve alternating between a four-cylinder (V4) mode of operation and an eight-cylinder (V8) mode of operation. Thus, when shifting from a V4 to a V8 mode, previously deactivated cylinders may be activated and all cylinders may fire. In contrast, when shifting from a V8 to a V4 mode, selected cylinders may be deactivated. In one example, the first four cylinders in the firing order may be deactivated, while the next four cylinders in the firing order may fire. However, during the transition between non-VDE to VDE mode, engine vibration may be experienced due to torsional vibrations. For example, when transitioning from non-VDE to VDE mode, the engine may be providing the same output with fewer cylinders firing and thus, torque fluctuation may occur due to fewer firing events and lower firing frequency, which may lead to increased engine vibration. This increase in engine vibration may not usually be detected by the vehicle operator since AEMs are configured to absorb vibrations from the engine. In order to ensure that AEMs are functioning as desired, AEM health may be monitored by conducting an AEM diagnostic routine periodically. In this way, undesirable engine NVH issues may be averted and vehicle performance may be improved.

Turning now to FIG. 5, a block diagram of an example autonomous driving system 500 that may operate, for example, the vehicle system 100 in conjunction with control system 15, described above at FIG. 1. Herein, the vehicle system 100 will be referred to simply as a "vehicle". The autonomous driving system 500, as shown, includes a user interface device 510, a navigation system 515, at least one autonomous driving sensor 520, an autonomous mode controller 525, and vehicle subsystems 530. Depicted as a solid vertical double-sided arrow is control system 15.

The user interface device 510 may be configured to present information to vehicle occupants, under conditions wherein a vehicle occupant may be present. However, it may be understood that the vehicle may be operated autonomously in the absence of vehicle occupants, under certain conditions. The presented information may include audible information or visual information. Moreover, the user interface device 510 may be configured to receive user inputs. Thus, the user interface device 510 may be located in a passenger compartment (not shown) of the vehicle. In some possible approaches, the user interface device 510 may include a touch-sensitive display screen.

The navigation system 515 may be configured to determine a current location of the vehicle using, for example, a Global Positioning System (GPS) receiver configured to triangulate the position of the vehicle relative to satellites or terrestrial based transmitter towers. The navigation system 515 may be further configured to develop routes from the current location to a selected destination, as well as display a map and present driving directions to the selected destination via, for example, the user interface device 510. In some examples the selected destination may comprise a destination selected via a passenger in the vehicle, or may be autonomously selected via the control system.

The autonomous driving sensors 520 may include any number of devices configured to generate signals that help navigate the vehicle. Examples of autonomous driving sensors 520 may include a radar sensor, a lidar sensor, a vision sensor (e.g. a camera), V2V and/or V2I2V infrastructure networks, or the like. The autonomous driving sensors 520 may enable the vehicle to "see" the roadway and vehicle surroundings, and/or negotiate various obstacles while the vehicle 100 is operating in autonomous mode. The autonomous driving sensors 520 may be configured to output sensor signals to, for example, the autonomous mode controller 525. It may be understood that such sensors may additionally be included in a vehicle that is not controlled autonomously, in order to assist in the conducting of particular vehicle maneuvers (see for example onboard cameras 191 and sensors 13 depicted above at FIG. 1).

The autonomous mode controller 525 may be configured to control one or more subsystems 530 while the vehicle is operating in the autonomous mode. Examples of subsystems 530 that may be controlled by the autonomous mode controller 525 may include a brake subsystem, a suspension subsystem, a steering subsystem, and a powertrain subsystem. The autonomous mode controller 525 may control any one or more of these subsystems 530 by outputting signals to control units associated with subsystems 530. In one example, the brake subsystem may comprise an anti-lock braking subsystem, configured to apply a braking force to one or more of wheels (e.g. 135). Discussed herein, applying the braking force to one or more of the vehicle wheels may be referred to as activating the brakes. To autonomously control the vehicle, the autonomous mode controller 525 may output appropriate commands to the subsystems 530. The commands may cause the subsystems to operate in accordance with the driving characteristics associated with the selected driving mode. For example, driving characteristics may include how aggressively the vehicle accelerates and decelerates, how much space the vehicle leaves behind a front vehicle, how frequently the autonomous vehicle changes lanes, speed of the vehicle, etc.

Whether the vehicle is autonomously operated, operated via a human driver, or some combination of both (e.g. human driver under some circumstances while autonomously operated under other circumstances), the vehicle systems described above may participate in car-sharing models. Discussed herein, a car-sharing model includes a model of car rental where people rent vehicles for short periods of time. In some examples, a customer may pay for the use of such a vehicle by the hour, as a function of miles driven, etc. Such vehicles may accumulate much more mileage in a short period of time than vehicles that do not participate in car-sharing. Accordingly, such vehicles are likely to have issues related to degradation on a potentially more frequent basis than other vehicles that do not participate in car-sharing models.

Figure 6:
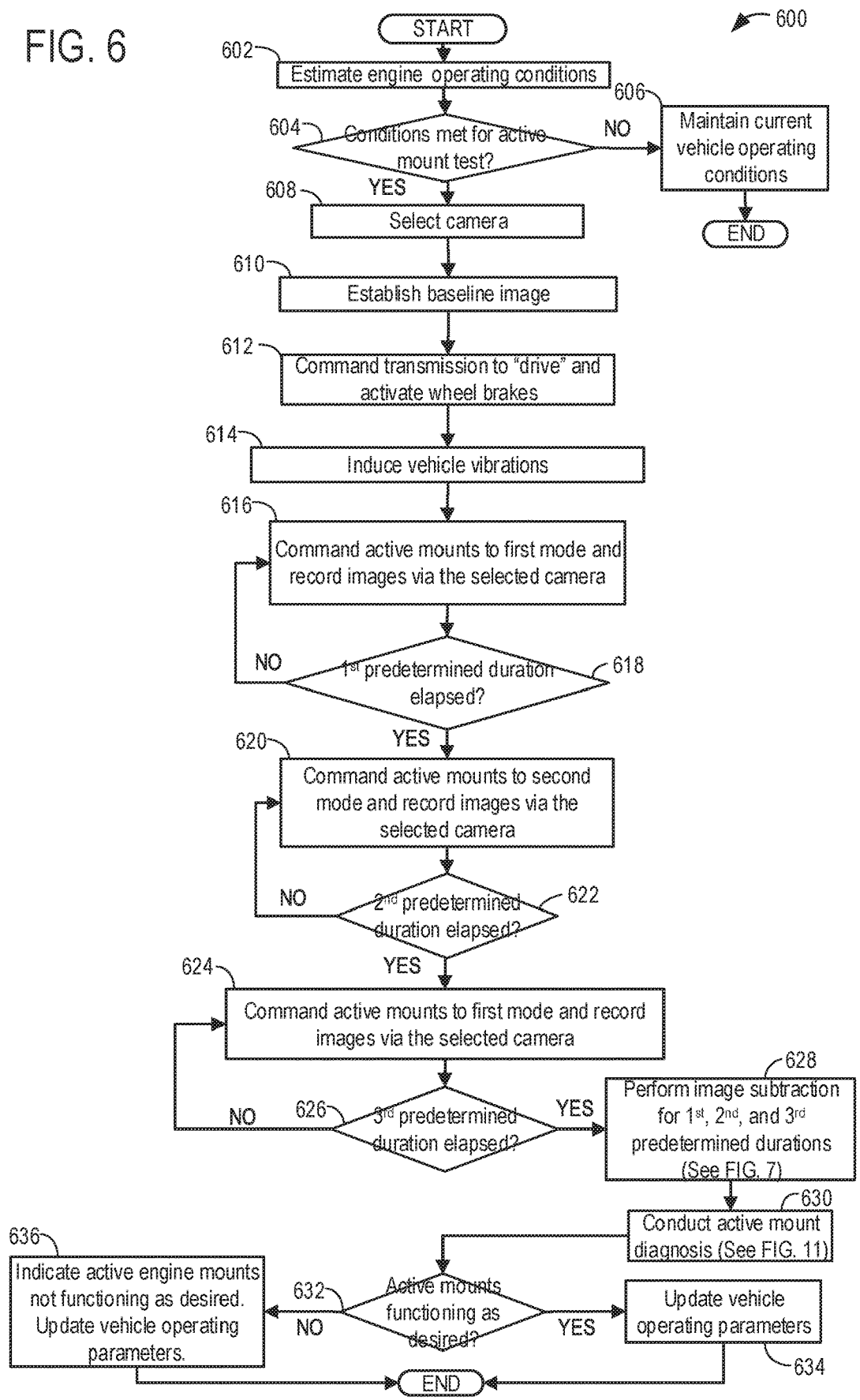
FIG. 6 shows a flow chart of an example method for an AEM system diagnostic routine, according to one or more embodiments of the present disclosure.
Figure 7:
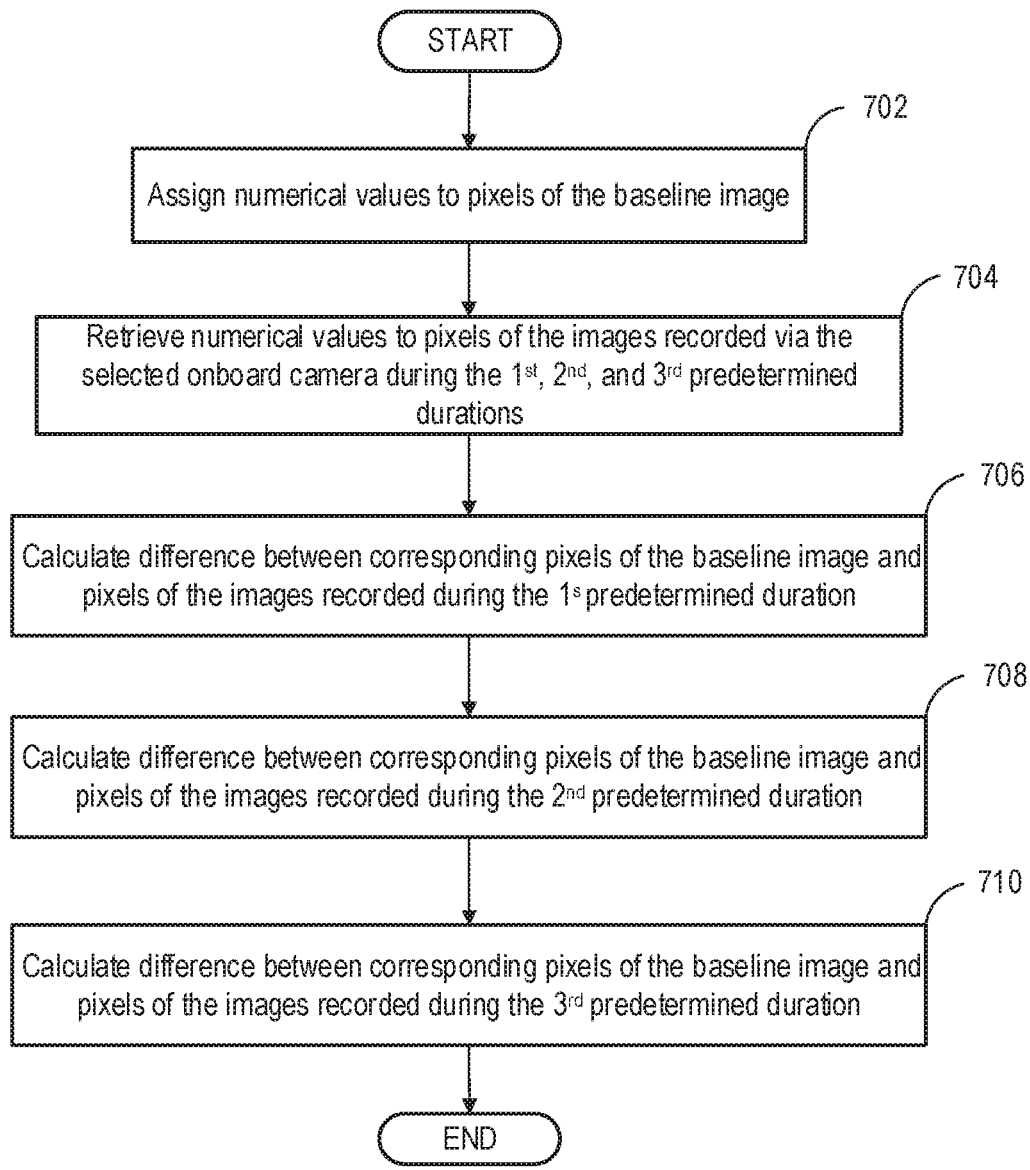
FIG. 7 shows a flow chart of an example method for performing image subtraction as part of an AEM system diagnostic routine, according to one or more embodiments of the present disclosure.

Turning to FIG. 6, a high-level example routine 600 for conducting an engine mount diagnostic, is shown. For example, via high-level example routine 600, during a stopped condition of the vehicle, stiffening and dampening modes of the AEM system may be commanded while inducing vehicle vibrations and recording images, and a condition of the AEM system may be indicated based on the recorded images.

Instructions for carrying out method 600 and the rest of the methods included herein may be executed by the controller based on instructions stored on a memory of the controller and in conjunction with signals received from sensors of the engine system, such as the sensors described above with reference to FIGS. 1-2 and FIG. 5. The controller may employ engine actuators of the engine system to adjust engine operation, according to the methods described below. For example, to adjust engine operation, the controller may employ any one or combination of actuators, including one or more of throttle (e.g. 197), injectors (e.g. 66), and spark plug (e.g. 188), to alter states of devices in the physical world according to the method depicted below.

At 602, engine operating conditions may be estimated, measured, and/or inferred. These may include, for example, vehicle speed, vehicle location, etc., various engine conditions, such as engine status, engine load, engine speed, A/F ratio, etc., various fuel system conditions, such as fuel level, fuel type, fuel temperature, etc., various evaporative emissions system conditions, such as fuel vapor canister load, fuel tank pressure, etc., as well as various ambient conditions, such as ambient temperature, humidity, barometric pressure, etc.

At 604, it may be determined whether conditions are met for conducting an AEM test. For example, conditions being met may include an engine on condition. Conditions being met for the AEM diagnostic may further include an indication that the vehicle is in an idle mode, where the engine is running, but where the vehicle is not in motion. Said another way, conditions may be met when the engine is running, but where the engine is in a static condition. By conducting the AEM test while the engine is running at idle and the vehicle is not in motion, the diagnostic may be performed while a computational load is relatively low compared to other conditions where the engine is running. That is, a condition where the engine is running at idle and the vehicle is not in motion is a domain in which the onboard computers (e.g. control system) are not overburdened with intense data processing and high speed task execution. Thus, there is low risk for an increase in computer usage to interfere with other vehicle controls. Such a timeframe where computational burden is low may enable image processing related to the AEM diagnostic, as will be further elaborated below, without undesirably increasing computational burden which may adversely impact other vehicle controls.

Still further, conditions being met for the AEM diagnostic may include a predetermined period of time elapsing since a prior AEM diagnostic was conducted. In some examples, the predetermined period of time may include 30 days, or less than 30 days. In other examples, the predetermined period of time may include greater than 30 days, but less than 60 days. In further examples the predetermined period of time may include greater than 60 days. Such examples are meant to be illustrative, and are not meant to be limiting.

Further, conditions being met for the AEM diagnostic may additionally or alternatively include an indication of a remote start event. For example, a vehicle operator may initiate a remote start event via a key fob (e.g. key fob 194 of FIG. 1), which may send a wireless signal (e.g. wireless signal 195 of FIG. 1) to a remote engine start receiver (e.g. remote engine start receiver 192 of FIG. 1), to initiate engine activation, such that the engine begins combustion of air and fuel.

In some examples, conditions being met for the AEM diagnostic may additionally or alternatively include an indication that the vehicle is not occupied. For example, the vehicle controller (e.g. controller 12 of FIG. 1) may interpret signals received from seat load cells (e.g. seat load cells 189 of FIG. 1), door sensing technology (e.g. door sensing technology 190 of FIG. 1, and/or onboard camera(s) of FIG. 1), to determine whether the vehicle is occupied. In some examples, method 600 may include prohibiting, or aborting an AEM diagnostic if the vehicle is indicated to be occupied. Furthermore, if it is indicated that the vehicle has become occupied while the diagnostic is in progress, the diagnostic routine may be aborted or suspended and may be resumed when the vehicle becomes unoccupied. Still further, it may be understood that, in some examples, the AEM diagnostic may be conducted even if it is indicated that the vehicle is occupied.

If conditions are not indicated to be met for the active mount test, then method 600 may proceed to 606 where the current vehicle operating conditions are maintained and no AEM diagnostic routine is conducted. Method 600 may then end.

If conditions are indicated to be met for conducting the AEM diagnostic, method 600 may then proceed to 608, where an onboard camera of the vehicle may be selected for performing the AEM diagnostic. The onboard camera selected for performing the AEM diagnostic may be the onboard camera with the most static focal object in view of the onboard camera.

In at least one example, the onboard camera may be selected by commanding all of the onboard cameras to enter a focus mode while the engine is operated at idle and the vehicle is static for a predetermined period of time. The onboard cameras may be cameras such as onboard cameras 191, for example. It may be understood that the onboard cameras may be placed any number of positions in the vehicle, without departing from the scope of this disclosure. As an example, one onboard camera may comprise a backup camera. Another onboard camera may be capable of taking images and/or video of an area in front of the vehicle. Still other onboard cameras may be capable of taking images and/or video to one or more sides of the vehicle.

During the focus mode, each onboard camera may attempt to identify a focal object in view thereof. For example, the focal object may include objects such as buildings, parked cars, trees, signs, etc.

After identifying a focal object, the onboard camera may focus on the focal object and record images of the focal object for the predetermined period of time, or until a predetermined number of images have been obtained (e.g. 3 images, 4 images, 5 images, etc.). In at least one example, the onboard cameras may be positioned such that each of the cameras focuses on a different object as the focal object. However, in some cases, there may be an object that is in view for multiple onboard cameras, and thus it may be possible that more than one of the onboard cameras may focus on the same object as the focal object during the focus mode. Moreover, in at least one example, one or more of the onboard cameras may not have a focal object in view. In a case where one or more of the onboard cameras does not have a focal object in view, it is noted that the one or more onboard cameras without a focal object in view may proceed to record images without focusing on a focal object. Or, alternatively, the one or more onboard cameras without a focal object in view may proceed to exit the focus mode and not record images during the predetermined focus mode time period. It may be understood that such operation of the onboard camera(s) may be under control of the controller (e.g. 12). For example, instructions stored at the controller may cause the controller to command the one or more onboard camera(s) to enter into the focus mode, where the one or more camera(s) are commanded to identify a focal object, and then to focus on the focal object and record images of the focal object for the predetermined period of time or until the predetermined number of images has been obtained. The recorded images may be stored at the controller, for example. The one or more camera(s) may be configured in a first setting for focusing and recording images at 608. The first setting may comprise one or more settings that may enable the one or more onboard camera(s) to compensate small vibrations or camera movements in order to obtain an images with low noise. Thus, while the controller may command the one or more onboard camera(s) to enter into the focus mode, image acquisition may be at least in part controlled by the camera operating in the first setting to obtain low noise images.

After the predetermined period of time has lapsed in the focus mode (with the camera operated via the first setting) and/or after the predetermined number of images has been obtained for each camera, the images recorded by the onboard cameras may be compared via instructions stored at the controller, to determine which onboard camera has the best static view with a focal object in view. Put another way, the images of each of the onboard cameras may be compared to determine which onboard camera has the most static view of a focal object.

For each camera, an initial image obtained may have a number of pixels, and each of the pixels may be assigned a gray scale (e.g. 1-5) in intensity. After the predetermined number of images has been obtained, the images obtained for each camera may be analyzed via the controller, and the camera with the least amount of change in overall pixel intensity may be selected as the camera to use for the AEM diagnostic, discussed below. Said another way, a change in intensity of each pixel for each image may be determined for each camera, and the changes in intensity may be summed or integrated to obtain an overall or total change in pixel intensity, and the camera with the least amount of pixel intensity change may be selected as the camera to use for conducting the diagnostic.

Thus, an amount of noise, or change in pixel intensity over time for each camera, may be calculated by comparing corresponding pixel intensities of each of the images captured by a particular camera. Corresponding pixels are pixels that are in a same position in separate images, for example. That is, each pixel may have a coordinate, and corresponding pixels are pixels which are positioned at the same coordinates as one another between images. The camera with the least amount of identified noise may be selected as the camera to use for the diagnostic. In this way, the technical effect of improved accuracy for the diagnostic may be achieved, as the minimal noise may increase an accuracy of image subtraction results (described in detail below).

However, it may be understood that in some examples, the amount of noise for each camera may be greater than a noise threshold. In such a case, the diagnostic may be aborted, as no camera is identifying an image with a low enough noise to conduct the diagnostic.

After selecting the onboard camera at step 608, method 600 includes establishing a baseline image at step 610. The baseline image may comprise the images for the particular camera recorded during the focus mode, integrated together. In other words, change in pixel intensity for each pixel between images for the particular camera may be integrated, to provide an integrated image reflecting the overall level of noise detected by the particular camera. Alternatively, in another example an updated integrated image may be used as the baseline image by commanding the selected onboard camera to record a plurality of images (e.g. 3 images, 4 images, 5 images, etc.) for a second period of time and integrating the change in pixel intensity for the images recorded during the second period of time to obtain the baseline image. Again, in this example, the selected onboard camera may acquire images via the first setting. The baseline image 610 may be used as a comparison point for performing image subtraction, as described in more detail below.

More specifically, in the first setting, the camera may be operated with one or more settings related to an ISO, shutter speed, and, in some examples, camera dampening settings to reduce image noise or, in other words, compensate for small vibrations and/or environmental factors. The baseline image acquisition settings (e.g. first setting) used when establishing the baseline image may be stored at the controller. Said another way, in obtaining the baseline image, the camera may control various settings to allow for low-noise images to be obtained. If those same settings are then used later on, as will be described below (e.g. during obtaining test images), it may be established with high-confidence that image noise recorded via the camera is due to actual noise (e.g. camera vibration) in comparison to the baseline image noise. However, it may be understood that in order to command the camera to acquire test images via the same settings as acquired with the camera via the first setting, the camera may be first transitioned to a second setting. The second setting may enable the controller to command the camera to record images using the same set of settings as the first setting, as opposed to the camera attempting to compensate for vibrations, environmental factors, etc. In other words, if the camera were not transitioned to the second setting, then the camera may attempt to compensate vibrations, for example, during acquisition of test images, which may skew results of the diagnostic. Such a concept is discussed in further detail below.

Once the baseline image is established, method 600 includes commanding the vehicle transmission to "drive" with wheel brakes activated at step 612. Such a step may be under control of the controller, and, in some examples may occur when the vehicle is unoccupied by an operator. More specifically, method 600 may include commanding the transmission to the drive mode of operation, or if already in drive mode, maintaining the transmission in drive mode. Furthermore, at step 612, method 600 may include activating wheel brakes via, for example, antilock braking system (e.g. antilock braking system 113 of FIG. 1) configured to increase hydraulic pressure to one or more vehicle wheels to increase braking force on the one or more wheels. In one example, the controller may be configured to command the brake pedal to be depressed. With the vehicle transmission configured in drive mode, and with the brake pedal depressed, or with brakes activated, the vehicle frame (e.g. vehicle frame 105 of FIG. 1) may be stiffened, and mechanically coupled to the engine (e.g. engine 10 of FIG. 1). In some examples, method 600 may further include the vehicle controller communicating with (e.g. sending a signal to), an electronic parking brake system to engage an electronic parking brake (e.g. electronic parking brake 152 of FIG. 1). Engaging the electronic parking brake may serve to further mechanically couple the vehicle frame to the engine.

At 614, vehicle vibration is induced by operating the engine to combust air and fuel while shutting-off fuel to a preselected engine cylinder to stimulate a misfire, or degraded combustion, condition. This mode of operation may be referred to herein as degraded combustion mode.

Inducing engine vibration via degraded combustion mode via shutting-off fuel to a preselected engine cylinder(s) to stimulate misfire condition may include sending a command to a fuel injector (e.g. fuel injector 66 of FIG. 1) and actuating the fuel injector to stop injection of fuel to the preselected engine cylinder while the engine is rotating. In one example, the preselected engine cylinder may include a cylinder that, when fuel injection is terminated to that cylinder, results in the greatest amount of vibration being transmitted to the vehicle frame. Thus, due to the stopping the injection of fuel to the preselected engine cylinder, a periodic vibration may be generated.

In other words, degraded combustion may be induced in the preselected cylinder such that engine mechanical vibration, the result of degraded combustion while fuel injection to the preselected cylinder is stopped, is transmitted to the vehicle frame in a predictable fashion. More specifically, vibrations from the engine and transferred to the vehicle frame may correspond to the degraded combustion events, such that degraded combustion events may be correlated with increased vibration. As will be discussed in further detail below, test images may be acquired when mechanical vibration is highest in terms of the degraded combustion. For example, a lookup table may be stored at the controller that includes information pertaining to when maximal engine vibration is expected as a result of degraded combustion events. Test image acquisition may be timed accordingly, such that images are acquired when it is expected that maximal engine vibration is occurring.

Alternatively, in one or more embodiments, vehicle vibrations may be induced via a non-combustion mode that includes spinning an engine unfueled while selectively deactivating valves of engine cylinders (e.g., selectively activating variable displacement engine (VDE) mode in a periodic fashion). In such an example, similar to that discussed above for degraded combustion events, a lookup table that includes empirically-derived information pertaining to timing of maximum mechanical vibration as a function of valve deactivation may be relied upon for obtaining test images (further discussed below).

Moreover, an engine speed (that is, an engine rotational speed) when inducing the vehicle vibrations at step 614 may be selected due to the engine speed inducing an increased amount of vehicle vibrations compared to other engine speeds. For example, the engine speed used for inducing vehicle vibrations may be selected by spinning the engine at various speeds, and then selecting an engine speed at which the greatest vibrations were induced in the vehicle frame to be used for inducing the vehicle vibrations at step 614. Engine speed may be controlled as such for examples where the engine is spun in a non-combustion mode, or when the engine is rotated as a result of combustion.

In at least one example, the engine speed used for inducing vehicle vibrations at step 614 may be updated periodically. For example, the engine speed used for inducing vehicle vibrations may be updated responsive to it being greater than a threshold time period since a previous update to the engine speed used for inducing vehicle vibrations. In one or more examples, the engine speed for inducing vehicle vibrations may be updated during each AEM system diagnostic is carried out. Increasing an amount of vehicle vibrations by updating the engine speed used during the AEM system diagnostic at 614 may advantageously improve an accuracy in diagnosing an AEM system condition. For example, as an engine RPM increases, engine misfires may have a decreased impact on engine vibrations compared to a low engine RPM in a case of engine misfire (degraded combustion). As such, in at least one example, the AEM diagnostic may be carried out at an engine rotational speed that is less than a threshold engine rotational speed to ensure that sufficient vibrations are created responsive to misfire events or other events that induce vibration as discussed above, to carry out the diagnostic. Such engine speeds may be mapped and stored as lookup table(s) at the controller.

In some examples, an electronically-controlled throttle (e.g. throttle 197 of FIG. 1) may be adjusted to a wider angle at 614, or more open position, such that more intake air may be routed to the engine for combustion (provided the vehicle vibrations are induced via cutting off fuel injection to an engine operating in combustion mode). In yet further examples, combustion initiation may be advanced in the remaining activated cylinders such that engine knock may occur which may further increase engine vibration.

In another example, a controller may be additionally configured to regulate engine speed (RPM) during the vibration inducing to increase and decrease the engine speed in a cyclic fashion for the duration of the AEM diagnostic. By changing the engine speed up and down in periodic fashion throughout the duration of the AEM test diagnostic, vehicle vibration may be increased. In a still further example, a compressor (e.g. A/C compressor 198 of FIG. 1) and A/C system (e.g. A/C system 199 of FIG. 1) may be periodically enabled and disabled. By cycling the A/C compressor between on and off conditions, vehicle vibration may be increased. Similar to that discussed above, if the A/C compressor is cycled on and off, test images (discussed in further detail below) may be obtained when mechanical vibration is highest as a result of at least the A/C compressor being cycled.

It may be understood that the above description for inducing vibrations represent different options for inducing the vibrations. Inducing vibrations may thus include one or more of the above options. In some examples, the particular means of inducing vibrations may be selected as a function of vehicle operating conditions, level of onboard energy storage (e.g. battery charge), fuel level, etc. For example, if battery charge is below a threshold charge where spinning the engine unfueled may adversely impact downstream applications, then the engine may be rotated in the combustion mode for inducing the vehicle vibrations. In another example, if fuel level is below a particular threshold, then the engine may be spun unfueled to conduct the diagnostic.

Once the vehicle vibration is induced, the method proceeds to 616 where AEMs are commanded to operate in a first mode (e.g. dampening mode) while recording test images via the onboard camera selected at step 608 for a first predetermined duration. The test images may be obtained at a same frequency that images were obtained as above for obtaining the baseline image. As mentioned above, the camera may be transitioned to the second setting for obtaining the test images. For example, the onboard camera selected at step 608 may focus on the same focal object as used to establish the baseline image at step 610 and continue to record images focused on the same focal object throughout the first predetermined duration. The number of images captured during the first predetermined duration may be the same as above for obtaining the baseline image, or may comprise a greater number of images. In at least one example, camera settings may be commanded to the same settings (e.g. ISO, shutter speed, and, if applicable, camera dampening settings) used to establish the baseline image at step 610, which may be enabled by the camera being transitioned to the second setting such that the same settings that were used to establish the baseline image may be again used for acquiring the test images. That is, the baseline settings stored in the controller may be used as a point of reference and maintained for recording images while vibrations are induced. The baseline settings may be commanded to the camera with the camera transitioned to the second setting.

For example, if not corrected for, responsive to vehicle vibration conditions which may cause the camera to shake, the first settings of the camera may automatically adjust one or more setting variables (e.g., ISO, shutter speed, camera dampening) to be different than the baseline image first settings, so that image noise may be maintained low. Said another way, the camera may attempt to reduce noise during test images, if the camera is in the first setting image acquisition. By transitioning the camera to the second setting, it may be understood that the camera will not overcompensate vibrations and/or environmental conditions which may otherwise result in camera noise being smoothed out or reduced, and which would thus compromise the integrity of the diagnostic.

Figure 13:
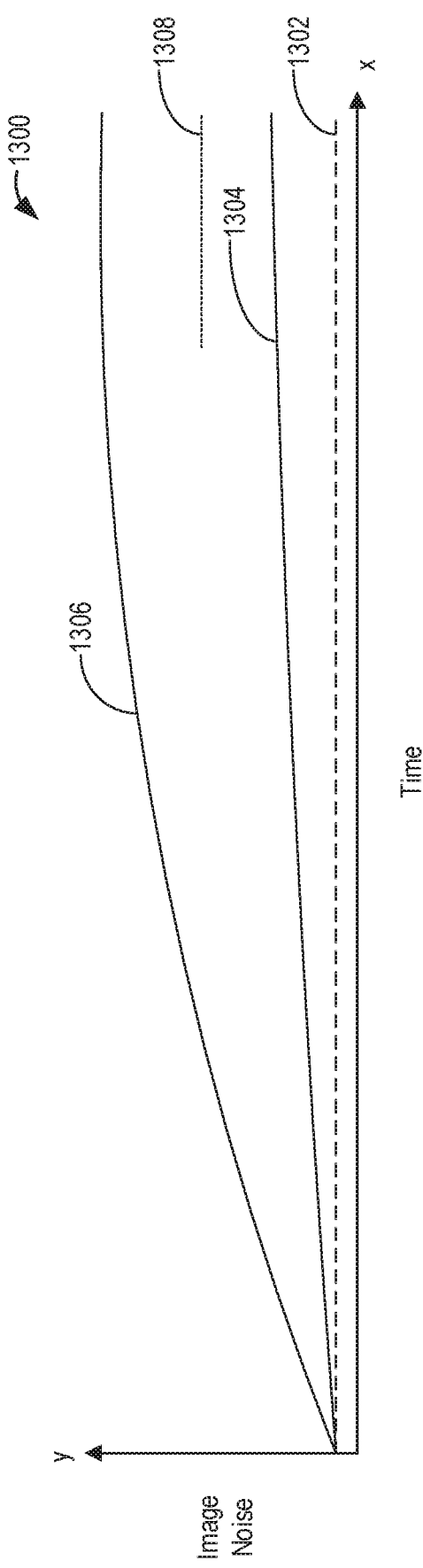
FIG. 13 shows a graphical representation of summed image noise with various camera settings, according to one or more embodiments of the present disclosure.

To illustrate this point, turning to graphical representation 1300 of FIG. 13, graphical representation 1300 represents an amount of noise over time in a case where induced vibrations of the diagnostic cause the vehicle (and thus the camera) to shake.

As shown in FIG. 13, baseline image noise 1302 over time is depicted. It may be understood that the first setting (which may comprise a set of particular camera settings) may be used to obtain baseline image noise 1302, and it may be further understood that the baseline image noise comprises a sum of baseline image noise acquired over time. As one example, the baseline image noise may have been obtained via the camera operating to acquire images where slight vibrations are compensated by the camera image acquisition control settings.

Trace 1304 depicts an amount of image noise that occurs during a test operation, where vibrations are induced. Trace 1304 further depicts an example where the camera is operated in the same first setting, and thus while there is an observed increase in camera noise over the camera noise indicated for the baseline images, the detected camera noise is much lower than trace 1306, in which the camera is transitioned to the second setting such that camera image acquisition settings are commanded to be the same as the settings that were acquired for obtaining the baseline images. Dashed line 1308 represents a threshold where, if below, it may be understood that the amount of camera image noise 1304 is concluded to not be different than the baseline image noise 1302. In other words, vibration is not indicated over baseline if the amount of camera noise 1304 is below the threshold 1308. Alternatively, because camera image noise 1306 is well above threshold 1308, then test images corresponding to camera image noise above threshold 1308 would be categorized as illustrating vibration as compared to the baseline image noise 1302.

Thus, it is clear from FIG. 13 that if the camera is allowed to operate in the first setting when obtaining test images, then in some examples the camera settings may compensate for induced mechanical vibrations, such that an absence of vibrations may be indicated (e.g. camera noise below the threshold 1308) when in fact, substantial vibrations are induced. By commanding the camera to the second setting, relevant camera settings (e.g. ISO, shutter speed, vibration dampening settings) may be commanded via the controller to be the same for obtaining test images as that used for obtaining baseline images. In this way, issues related to indicating an absence of vibrations, when in fact there are substantial induced vibrations, may be avoided.

Turning back to step 616 at FIG. 6, operating AEMs in a first, dampening mode is expected to dampen vehicle vibration, such that little or no vibration occurs. It is noted that reference to an expected functioning of the AEM may also be referred to herein as a desired functioning of the AEM. Thus, as little or no vibration is expected to occur at step 616, less than a threshold amount of noise is expected to exist between the baseline image and the images recorded via the selected onboard camera during the first predetermined duration. A process for calculating the amount of noise between the baseline image and the images recorded during the first predetermined duration may be further detailed at FIG. 7.

Figure 12:
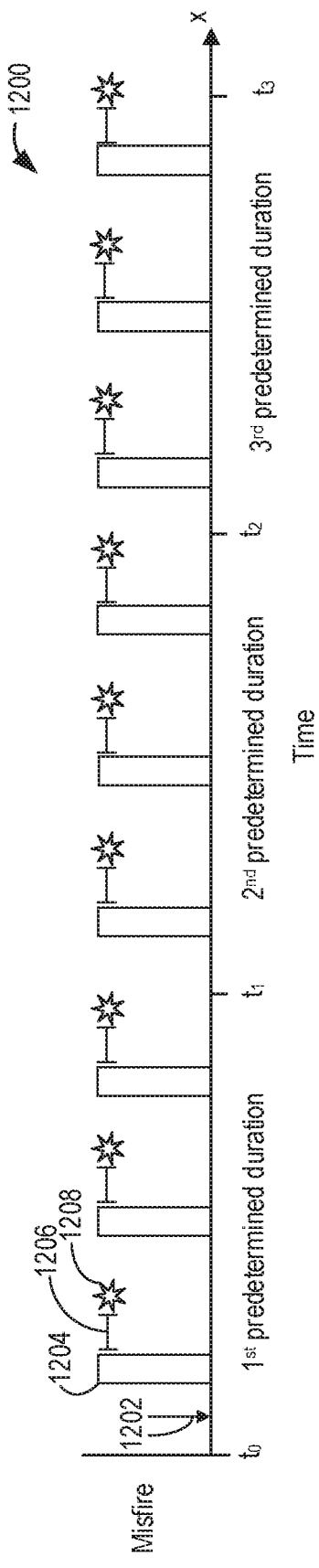
FIG. 12 shows a graphical representation of an approach for recording images, according to one or more embodiments of the present disclosure.

As mentioned above, in order to ensure that camera images are taken when it is expected that the mechanically-induced vibrations are occurring, the controller may rely on one or more lookup tables that relate a time at which the mechanical vibrations are induced, to a time afterward that the mechanical vibrations are realized. Turning to FIG. 12, it shows an example where the mechanical vibrations are induced via commanding a cylinder cut off from fuel when the engine is operating to combust air and fuel. Accordingly, for the first predetermined duration that relates to step 616 of method 600, fuel to a cylinder is shut off at a particular time exemplified by arrow 1202. Misfire, represented as 1204, occurs shortly thereafter, and a threshold amount of time 1206 occurs between when the misfire 1204 occurs and when vibrations are maximal, represented by star 1208. Accordingly, images may be captured at precisely after the threshold time (e.g. 1206) elapses after the misfire event. Thus, it may be understood that the star 1208 represents both when mechanical vibrations are maximal and the time when images are acquired.

Continuing to 618, it may be determined whether the first predetermined time duration has elapsed. If the first predetermined time duration has not elapsed, then method 600 may return to 616 where the AEMs may continue to operate in the first mode and continue to record images via the selected onboard camera in the first operating mode until the first predetermined duration has elapsed. If the first predetermined duration has elapsed, then method 600 may store the images captured at 618 at the controller, and may proceed to 620.

At 620, the AEMs are commanded to operate in a second mode of operation (e.g., stiffening mode) while images are again recorded via the selected onboard camera for a second predetermined duration. The selected onboard camera may record images as described above at least at step 616. As seen at FIG. 12, images may once again be captured (see star 1208) in a similar manner as during the first predetermined duration. In other words, following fuel cut-off 1202, and after the first predetermined duration elapses, images may be acquired after the threshold amount of time 1206 elapses from each misfire event.

In the stiffening mode, induced vehicle vibrations may be expected to be significant, or not substantially dampened, such that an amount of noise between the baseline image and images recorded via the selected onboard camera during the second predetermined duration is greater than a threshold. As discussed above, a method for determining whether the amount of noise between the baseline image and recorded images during the second predetermined duration is depicted at FIG. 7.

Commanding the AEMs to the second mode at 620 may include commanding the AEMs to the second mode for a second predetermined time duration. In some examples, the second predetermined time duration may be different than that of the first predetermined time duration. In another example, the second predetermined duration may be identical with the first predetermined time duration. In some examples, a number of images captured during the first predetermined time duration and the second predetermined time duration may be the same.

At 622, it may be determined whether the second predetermined time duration has elapsed. If the second predetermined time duration has not elapsed, method 600 may return to 620, where the AEMs are maintained in the second mode, and the resulting pattern of vehicle frame vibration may continue to be recorded until a second predetermined duration has elapsed. If the second predetermined duration has elapsed, the method proceeds to 624.

At 624, method 600 may include commanding the AEMs to operate again in the first dampening mode while recording images via the selected onboard camera. The return to the first mode (e.g. dampening mode) of operation may be carried out for a third predetermined time duration. Once again, as shown at FIG. 12, images (see stars 1208) may be captured in a similar manner as during the first predetermined duration and second predetermined duration.

Accordingly, similar results as occurred at step 616 of method 600 are also expected to occur at step 624. That is, little or no vibration may be expected to occur at step 624, and less than the threshold amount of noise may be expected to exist between the baseline image and the images recorded via the selected onboard camera during the third predetermined duration, due to the AEMs being commanded to the dampening mode. As discussed, a process for calculating the amount of noise between the baseline image and the images recorded during the third predetermined duration may be further detailed at FIG. 7. It is noted that in some examples, the third predetermined time duration may be the same, or substantially the same, as the first predetermined time duration and/or the second predetermined time duration. In another example, the third predetermined time duration may not be the same time duration as that of the first predetermined time duration, or the second predetermined time duration. In some examples, a number of images recorded during the third predetermined time duration may be the same as the number of images recorded for each of the first predetermined time duration and/or the second predetermined time duration.

At 626, method 600 may include indicating whether the third predetermined time duration has elapsed. If, at 626, the third predetermined time duration has not elapsed, method 600 may return to 624, and may include continuing to maintain the AEMs in the first mode, and may further include continuing to record the resulting pattern of vehicle frame vibration.

Otherwise, the method may proceed to 628, where an amount of image noise between the baseline image and images recorded during each of the first, second, and third predetermined durations is calculated. Additionally, the selected onboard camera may be transitioned from the second setting to the first setting at step 628. In at least one example, image subtraction may performed between the baseline image and the images recorded during the first predetermined duration, the second predetermined duration, and the third predetermined duration to calculate an amount of image noise. Further details as to performing the image subtraction may be found at FIG. 7.

After performing image subtraction for the first, second, and third predetermined durations at step 628 of method 600, method 600 may include conducting an AEM diagnosis at step 630 of method 600. The conditions of the active engine system mount may be determined according to the table depicted in FIG. 11 and used for the diagnosis, which will be further elaborated below.

Briefly, based on noise patterns between the baseline image and the images recorded by the selected onboard camera during the first, second and third predetermined durations, the controller may be configured to detect if the vibration patterns exceed a noise threshold in each of the selected AEM operating modes. For example, a noise threshold for each selected operating mode may have been pre-set by the vehicle manufacturer and updated into the vehicle memory, and during AEM diagnosis routine, the controller may compare the values between the recorded noise to the noise threshold values. If the noise patterns falls within the threshold values, then it may be inferred that the vibration patterns were as expected and that the AEMs are functioning as desired. However, if the noise patterns are not within the threshold values, then it may be inferred that the AEMs are not functioning as desired. In one example, the table depicted at FIG. 11 may comprise three potential outcomes of the AEM diagnosis, which may include indicating the AEMs are functioning as desired or not as desired. As an example, indicating the AEMs are not functioning as desired may further include indicating that the AEMs being stuck in either, the first, dampening mode or the second, stiffening mode.

At 632, based on the diagnosis outcome from FIG. 11, it may be determined if the AEMs are functioning as desired. Responsive to an indication that the AEMs are functioning as desired, method 600 may proceed to 634, and may include updating vehicle operating parameters. Updating vehicle operating parameters at 634 may include storing the results of the test diagnostic at the controller.

Alternatively, at 632, if the AEMs are not functioning as desired, method 600 may proceed to 636 where it is indicated that the AEMs are not functioning as desired. For example, at 636, method 600 may include indicating that either the AEMs are stuck in the first, dampening mode, or that the AEMs are stuck in the second, stiffening mode. The method may further include updating vehicle operating parameters. For example, updating vehicle operating parameters at 636 may include storing the results of the test diagnostic at the controller. More specifically, it may be indicated that the AEMs are stuck in one of the first mode, or the second mode, depending on the outcome of the test diagnostic (from FIG. 11). Updating vehicle operating parameters may further include setting a flag at the controller, or setting a diagnostic trouble code (DTC). The DTC may include displaying a visual indicator (e.g., illuminating a light) and/or presenting an audio indicator within the car. For example further, updating vehicle operating parameters may include providing an operator alert. In one or more examples, updating the vehicle operating parameters may include one or more of illuminating a malfunction indicator light (MIL), an audio alert, and a message alerting a vehicle operator (if present) of the need to service the vehicle. In one example, updating vehicle operating parameters may include limiting a maximum engine speed responsive to an indication that the AEMs are stuck in the second, stiffening mode.

Additionally, at both steps 634 and 636, updating vehicle operating parameters may include updating an engine idle speed in the controller. For example, the engine idle speed may be specifically tuned to the condition of the AEMs to reduce vibration at idle. In such examples, the engine may then be operated at the updated engine idle speed during idle mode conditions following step 634 or step 636.

In one or more examples, the engine idle speed may be increased responsive to the AEMs not functioning as desired. By increasing the engine idle speed, an amount of NVH when operating the engine at idle may be reduced. In some examples, the engine idle speed may only be increased responsive to determining that the AEM system is stuck in a stiffening mode. In one or more examples where the AEM system may be diagnosed as stuck in a dampening mode or where the AEM system is diagnosed to be functioning as desired, the engine idle speed may be maintained.

Turning now to FIG. 7, it shows a flowchart 700 of an example method for performing image subtraction, for use at step 628 of method 600). As method 700 stems from method 600, it may be understood that instructions for carrying out method 700 may be executed by the controller based on instructions stored on a memory of the controller and in conjunction with signals received from sensors of the engine system, such as the sensors described above with reference to FIGS. 1-2 and FIG. 5.

Method 700 begins at 702, and may include retrieving the numerical values associated with pixel intensity of the baseline image, obtained at 610 of method 600. As discussed, the intensity assigned to each pixel may be on a numerical scale (e.g., a scale of 1 to 5). For example, the greater the intensity of the pixel, the higher the intensity numerical value may be assigned. In some examples, rather than assigning each pixel a numerical value, the baseline image may be divided into multiple regions, and an average intensity of the pixels for each of the multiple regions may be assigned a numerical value based on grayscale intensity. In examples where multiple regions are used to assign numerical values based on average pixel intensity in each of the regions, the number of the multiple regions may be greater than a threshold number of regions to ensure accurate results. If the baseline image is not a gray scale image, then the baseline image may first be converted to grayscale before assigning the numerical values to pixels of the baseline image.

After retrieving numerical values corresponding to pixels of the baseline image at step 702, step 704 of method 700 may include assigning numerical values to pixels of the test images recorded via the selected onboard camera during the first, second, and third predetermined durations. The selected onboard camera may be the camera selected at step 608, for example.

Assigning the numerical values to the pixels of the images recorded via the selected onboard camera during the first, second, and third predetermined durations may be carried out in any of the manners described above and with reference to steps 610 of method 600 and step 702 of method 700. For example, each pixel of the images recorded via the selected onboard camera during the first, second, and third predetermined durations may be assigned a numerical value based on grayscale intensity. It may be understood that the numerical scale used to assign the gray scale intensity to the images recorded via the selected onboard camera during the first, second, and third predetermined durations may be the same numerical scale as used to assign numerical values to the baseline image. Similar to that for the baseline image, the changes in pixel intensity between images for each of the first, second, and third predetermined durations may be summed or integrated, to obtain a first integrated image for the first predetermined duration, a second integrated image for the second predetermined duration, and a third integrated image for the third predetermined duration.

In another example, as described above in reference to step 702, images recorded via the selected onboard camera during the first, second, and third predetermined durations may be divided into multiple regions, and the pixels in each of the multiple regions may be assigned an average pixel intensity. In such examples where multiple regions of pixels may be used, it is noted that the baseline image may be divided into the same multiple regions as the images recorded by the selected onboard camera during the first, second, and third predetermined durations. In such a case, the baseline integrated image, the first integrated image, the second integrated image, and the third integrated image may comprise integrated images of the averaged pixel intensity for each of the multiple regions for each condition (e.g. baseline, first mode, second mode).

As described above in reference to step 702, it may be understood that if the images recorded via the selected onboard camera during the first, second, and third predetermined durations are not in grayscale, such images may be converted to grayscale prior to assigning numerical values to the pixels.

After assigning numerical values to the pixels of the images recorded via the selected onboard camera during the first, second, and third predetermined durations at step 704, method 700 may include calculating a difference between corresponding pixels (or averaged pixel region) of the baseline image and pixels of the images recorded during the first predetermined duration via the selected onboard camera at step 706. In other words, the baseline integrated image may be subtracted from the first integrated image. The subtraction may be conducted via the controller. The resulting difference between the first integrated image and the baseline image represents an amount of noise between the baseline image and the first integrated image generated via the integration of images recorded via the selected onboard camera during the first predetermined duration.

At times where the selected onboard camera has vibrated to at least some extent while recording during the first predetermined duration (e.g., due to vehicle vibration), the difference between the pixel intensity of the integrated baseline image and the corresponding pixels of the first integrated image recorded by the selected onboard camera during the first predetermined duration may be greater as compared to when the selected onboard camera has not vibrated to any significant extent. In other words, the greater the amount of noise, the greater an amplitude of vibration may be determined to have occurred.

It is noted that in at least one example, reference to the difference between the corresponding pixels of the baseline image and pixels of the images recorded during the first, second, and third predetermined durations, may refer to an absolute difference. That is, the resulting difference may be a magnitude value of the difference without regards to sign.

However, it is possible that the difference between the corresponding pixels of the baseline image and the pixels of the recorded images recorded during the first, second, and third predetermined durations may be assigned positive or negative signs. Examples where positive or negative signs may be assigned to differences resulting from subtraction of the baseline image from the pixels of the images recorded during the first, second, and third predetermined durations may utilize different thresholds for summed image noise compared to examples where an absolute difference is used, as further explained at least at FIG. 8B.

The differences calculated between the images recorded by the selected onboard camera during the first predetermined duration and the baseline image may be used diagnose the AEM system, as detailed at FIGS. 8A-11.

After calculating the difference in intensity between corresponding pixels of the baseline image and pixels of the first integrated image as generated via the images obtained during the first predetermined duration at step 706, method 700 may include carrying out a similar process for calculating the difference between pixels of the images recorded by the selected onboard camera during the second predetermined duration and the baseline image at step 708 and the images recorded by the selected onboard camera during the third predetermined duration and the baseline image at step 710. The differences may be stored at the controller, and may be analyzed as per FIG. 11, discussed in detail below.

Briefly, it may be understood that the data may be analyzed as follows. When the AEMs are commanded to the dampening mode, if functioning as desired, induced degraded combustion events would be expected to be dampened, while significant vibrations may be observed for the degraded combustion events when the AEMs are commanded to the stiffening mode. Thus, the difference between the first integrated image and the baseline integrated image may be expected to be low, and similarly the difference between the third integrated image and the baseline integrated image may be expected to be low. Alternatively, the difference between the second integrated image and the baseline integrated image may be expected to be greater.

Alternatively, if the AEMs are stuck in the dampening mode, then the difference between integrated test images compared to integrated baseline images for each of the first duration, second duration, and third duration may all be low, as in none of the conditions (damped vs stiff modes of AEM operation) would the induced vibrations be expected to result in significant vibration of the onboard camera. In still another example, if the AEMs are stuck in the stiffening mode, then the difference between integrated test images compared to integrated baseline images for each of the first duration, second duration, and third duration may all be expected to be greater, as in none of the conditions (damped vs stiff modes of AEM operation) would the induced vibrations be expected to be damped, and thus in each case there would be expected to be significant vibration of the onboard camera. This is illustratively depicted below at FIGS. 8A-10, and a lookup table stored at the controller for enabling analysis of the data obtained by conducting the AEM diagnostic procedure is depicted at FIG. 11.

Moving now to FIG. 8A, it shows a graphical representation 800 of an example relationship between camera image noise, engine misfire events (also referred to as degraded combustion events), and an AEM mode during a first AEM system diagnostic. In particular, graphical representation 800 shows an example relationship when the AEMs are functioning as desired.

The X-axis of the graphical representation represents time, where time increases in a direction of an arrow of the X-axis. It is noted that the X-axis in each of the plots shown in FIG. 8A shares a same timeline. It is noted that the misfire events and the active engine mount modes occur at the same time during the diagnostic. However, the camera image noise shown is a representation of image noise fluctuations that are calculated via the image subtraction methods described herein. Thus, although the camera image noise as depicted corresponds with the timeline shown in FIG. 8A, it is possible that the calculations for image noise occurred following the diagnostic, as opposed to being calculated in real-time. Alternatively, however, it is possible that the camera image noise 802 is calculated in real-time. Said another way, FIG. 8A depicts how degraded combustion events may contribute to camera image noise over time, depending on whether the active engine mounts are commanded to the first mode or the second mode of operation.

Accordingly, the Y-axis of the top plot represents camera image noise, where an amount of camera image noise increases in the direction of the Y-axis arrow. Camera image noise comprises the difference between the integrated image for the particular AEM mode and the baseline integrated image, as discussed above.

The Y-axis of the second plot from the top represents engine misfire events. The engine misfire events shown in the second plot from the top may be induced via any one or combination of approaches described herein, for example. Each engine misfire event 808 occurs at the signals included in the second plot from the top.

The Y-axis of the bottom plot represents an AEM mode that is commanded, where the AEM mode is commanded to a dampening mode when near a top of the Y-axis, and where the AEM mode is commanded to a stiffening mode when near a bottom of the Y-axis. It is noted that the heavy dots in the top plot represent time points at which images 803 are captured to carry out image summing in FIG. 8B. While it is indicated that one image 803 is acquired near the maximum amount of noise expected due to misfire, it may be understood that in other examples, more than one image may be obtained near the time when it is expected that vibration noise may be maximal. In still further examples, images may be obtained in periodic fashion such that it is highly likely that the images obtained will accurately represent an amount of noise over the course of each predetermined duration (e.g. first, second and third predetermined durations).

As shown in graphical representation 800, the AEM system is commanded to dampening mode 810 for a first predetermined duration from time $t_0$ to time $t_1$, and the camera image noise 802 remains relatively low from time $t_0$ to time $t_1$. For the second predetermined duration, the AEM system is commanded to stiffening mode 812 and there is increased camera noise 804 corresponding to the degraded misfire events 808. For the third predetermined duration, the AEM system is commanded again to dampening mode 810 and once again there is a relatively low level of camera image noise 806.

Turning to FIG. 8B, it shows how image noise increases over time for each of the first predetermined duration, second predetermined duration, and third predetermined duration. The X-axis of graphical representation 850 in FIG. 8B represents time, with time increasing in a direction of the arrow of the X-axis. Times $t_0$, $t_1$, $t_2$, and $t_3$ of graphical representation 800 correspond to times $t_0$, $t_1$, $t_2$, and $t_3$ of graphical representation 850. Additionally, the first, second, and third predetermined durations of graphical representation 800 correspond to the first, second, and third predetermined durations of the summed image noise graphical representation 850, respectively.

Though the times in summed image noise graphical representation 850 correspond with the times in graphical representation 800, it is noted that the summing of image noise does not necessarily occur concurrently with the diagnostic. Rather, the summed image noise graphical representation 850 illustrates a summing process for camera image noise 802. Thus, the summing process of the camera image noise 802 may occur after the camera image noise 802 has been recorded, and may not occur in real-time. Alternatively, however, it is possible that summing of the camera image noise 802 occurs in real-time. In any event, FIG. 8B depicts how camera image noise increases over time as the diagnostic for a particular predetermined duration for a particular mode of AEM operation is conducted. The Y-axis of FIG. 8B represents an amount of summed image noise and increases in a direction of the Y-axis arrow.

As discussed with regard to FIG. 6, integrated camera image noise for each of the first predetermined duration, second predetermined duration, and third predetermined duration may be compared to the integrated baseline image. FIG. 8B thus depicts graphically how camera image noise is integrated for the first predetermined duration, second predetermined duration, and third predetermined duration. Whether the integrated camera image noise for each predetermined duration remains below a threshold difference, represented by dashed line 852, from the integrated baseline image, or exceeds the threshold difference, may be used to infer via the lookup table depicted at FIG. 11, whether the AEMs are functioning as desired, are stuck in the first mode, or are stuck in the second mode.

For FIG. 8B, plot 854 represents integrated camera image noise for the first predetermined duration, plot 856 represents integrated camera image noise for the second predetermined duration, and plot 858 represents integrated camera image noise for the third predetermined duration. As can be seen, integrated camera image noise for the first predetermined duration and the third predetermined duration remains below the threshold difference 852 from the integrated baseline image (not shown at FIG. 8B but which is used to set the threshold difference 852), while integrated camera image noise for the second predetermined duration exceeds the threshold difference 852.

Turning to the lookup table of FIG. 11, because the integrated camera image noise remained below the threshold difference for the first duration and the third duration, while exceeding the threshold difference for the second duration, such a pattern corresponds to outcome A. Accordingly, it may be determined that the AEMs are functioning as desired or expected. In other words, the AEMs dampened vibrations as monitored via the onboard cameras when commanded to the dampening mode, while the vibrations were not dampened when commanded to the stiffening mode, as would be expected for AEMs that are functioning as desired.

Moving now to FIG. 9A, it shows a graphical representation 900 of an example relationship between camera image noise, engine misfire events (also referred to as degraded combustion events), and an AEM mode during a second AEM system diagnostic. In particular, graphical representation 900 shows an example relationship when the AEMs are stuck in the first mode, or in other words, stuck in the dampening mode. At FIG. 9A, the AEM system is commanded to dampening mode 910 for a first predetermined duration from time $t_0$ to time $t_1$, and the camera image noise 902 remains relatively low from time $t_0$ to time $t_1$. For the second predetermined duration, the AEM system is commanded to stiffening mode 912, and there is again a relatively low level of camera image noise 906. For the third predetermined duration, the AEM system is commanded again to dampening mode 910 and once again there is a relatively low level of camera image noise 906. It is noted that the heavy dots in the top plot represent time points at which an image 903 is captured to carry out image summing in FIG. 9B. However, as discussed above with regard to FIG. 8A, while it is indicated that one image 903 is acquired near the maximum amount of noise expected due to misfire, it may be understood that in other examples, more than one image may be obtained near the time when it is expected that vibration noise may be maximal. In still further examples, images may be obtained in periodic fashion such that it is highly likely that the images obtained will accurately represent an amount of noise over the course of each predetermined duration (e.g. first, second and third predetermined durations).

Turning to FIG. 9B, it shows a graphical representation 950 of how image noise increases over time for each of the first predetermined duration, second predetermined duration, and third predetermined duration. The X-axis of graphical representation 950 in FIG. 9B represents time, with time increasing in a direction of the arrow of the X-axis. Times $t_0$, $t_1$, $t_2$, and $t_3$ of graphical representation 900 correspond to times $t_0$, $t_1$, $t_2$, and $t_3$ of graphical representation 950. Additionally, the first, second, and third predetermined durations of graphical representation 900 correspond to the first, second, and third predetermined durations of the summed image noise graphical representation 950, respectively.

Though the times in summed image noise graphical representation 950 correspond with the times in graphical representation 900, it is noted that the summing of image noise does not necessarily occur concurrently with the diagnostic. Rather, the summed image noise graphical representation 950 illustrates a summing process for camera image noise 902. Thus, the summing process of the camera image noise 902 may occur after the camera image noise 902 has been recorded, and may not occur in real-time. Alternatively, however, it is possible that summing of the camera image noise 902 occurs in real-time. In any event, FIG. 9B depicts how camera image noise increases over time as the diagnostic for a particular predetermined duration for a particular mode of AEM operation is conducted. The Y-axis of FIG. 9B represents an amount of summed image noise and increases in a direction of the Y-axis arrow.

As discussed with regard to FIG. 6, integrated camera image noise for each of the first predetermined duration, second predetermined duration, and third predetermined duration may be compared to the integrated baseline image. FIG. 9B thus depicts graphically how camera image noise is integrated for the first predetermined duration, second predetermined duration, and third predetermined duration. Whether the integrated camera image noise for each predetermined duration remains below a threshold difference, represented by dashed line 952, from the integrated baseline image, or exceeds the threshold difference, may be used to infer via the lookup table depicted at FIG. 11, whether the AEMs are functioning as desired, are stuck in the first mode, or are stuck in the second mode.

For FIG. 9B, plot 954 represents integrated camera image noise for the first predetermined duration, plot 956 represents integrated camera image noise for the second predetermined duration, and plot 958 represents integrated camera image noise for the third predetermined duration. As can be seen, integrated camera image noise for the first predetermined duration, the second predetermined duration, and the third predetermined duration all remain below the threshold difference 952 from the integrated baseline image (not shown at FIG. 9B but which is used to set the threshold difference 952).

Turning to the lookup table of FIG. 11, because the integrated camera image noise remained below the threshold difference for the first duration, the second duration, and the third duration, such a pattern corresponds to outcome B. Accordingly, it may be determined that the AEMs are not functioning as desired or expected, and that the AEMs may be stuck in a first mode. In particular, as the dampening occurs both when the AEMs are commanded to the dampening mode and when the AEMs are commanded the stiffening mode, it may be determined that the active mounts are stuck in the dampening mode.

Turning now to FIG. 10A, it shows a graphical representation 1000 of an example relationship between camera image noise, engine misfire events (also referred to as degraded combustion events), and an AEM mode during a third AEM system diagnostic. In particular, graphical representation 1000 shows an example relationship when the AEMs are stuck in the second mode, or in other words, stuck in the stiffening mode. At graphical representation 1000, the AEM system is commanded to dampening mode 1010 for a first predetermined duration from time $t_0$ to time $t_1$, and the camera image noise 1002 is relatively high from time $t_0$ to time $t_1$. For the second predetermined duration, the AEM system is commanded to stiffening mode 1012, and there is again a relatively high level of camera image noise 1004. For the third predetermined duration, the AEM system is commanded again to dampening mode 1010 and once again there is a relatively high level of camera image noise 1006.

Turning to FIG. 10B, it shows a graphical representation 1050 of how image noise increases over time for each of the first predetermined duration, second predetermined duration, and third predetermined duration. The X-axis of graphical representation 1050 in FIG. 10B represents time, with time increasing in a direction of the arrow of the X-axis. Times $t_0$, $t_1$, $t_2$, and $t_3$ of graphical representation 1000 correspond to times $t_0$, $t_1$, $t_2$, and $t_3$ of graphical representation 1050. Additionally, the first, second, and third predetermined durations of graphical representation 1000 correspond to the first, second, and third predetermined durations of the summed image noise graphical representation 1050, respectively. It is noted that the heavy dots in the top plot represent time points at which an image 1003 is captured to carry out image summing in FIG. 10B. However, similar to that discussed above for FIG. 8A and FIG. 9A, while it is indicated that one image 1003 is acquired near the maximum amount of noise expected due to misfire, it may be understood that in other examples, more than one image may be obtained near the time when it is expected that vibration noise may be maximal. In still further examples, images may be obtained in periodic fashion such that it is highly likely that the images obtained will accurately represent an amount of noise over the course of each predetermined duration (e.g. first, second and third predetermined durations).

Though the times in summed image noise graphical representation 1050 correspond with the times in graphical representation 1000, it is noted that the summing of image noise does not necessarily occur concurrently with the diagnostic. Rather, the summed image noise graphical representation 1050 illustrates a summing process for camera image noise (e.g. 1002, 1004, and 1006). Thus, the summing process of the camera image noise may occur after the camera image noise has been recorded, and may not occur in real-time. Alternatively, however, it is possible that summing of the camera image noise occurs in real-time. In any event, FIG. 10B depicts how camera image noise increases over time as the diagnostic for a particular predetermined duration for a particular mode of AEM operation is conducted. The Y-axis of FIG. 10B represents an amount of summed image noise and increases in a direction of the Y-axis arrow.

As discussed with regard to FIG. 6, integrated camera image noise for each of the first predetermined duration, second predetermined duration, and third predetermined duration may be compared to the integrated baseline image. FIG. 10B thus depicts graphically how camera image noise is integrated for the first predetermined duration, second predetermined duration, and third predetermined duration. Whether the integrated camera image noise for each predetermined duration remains below a threshold difference, represented by dashed line 1052, from the integrated baseline image, or exceeds the threshold difference, may be used to infer via the lookup table depicted at FIG. 11, whether the AEMs are functioning as desired, are stuck in the first mode, or are stuck in the second mode.

For FIG. 10B, plot 1054 represents integrated camera image noise for the first predetermined duration, plot 1056 represents integrated camera image noise for the second predetermined duration, and plot 1058 represents integrated camera image noise for the third predetermined duration. As can be seen, integrated camera image noise for the first predetermined duration, the second predetermined duration, and the third predetermined duration all exceed the threshold difference 1052 from the integrated baseline image (not shown at FIG. 10B but which is used to set the threshold difference 1052).

Turning to the lookup table of FIG. 11, because the integrated camera image noise exceeded the threshold difference for the first duration, the second duration, and the third duration, such a pattern corresponds to outcome C. Accordingly, it may be determined that the AEMs are not functioning as desired or expected, and that the AEMs may be stuck in a second mode. In particular, as dampening of the induced vibrations does not occur when the AEMs are commanded to the dampening mode or when the AEMs are commanded the stiffening mode, it may be determined that the active mounts are stuck in the stiffening mode.

In this way, onboard cameras of the vehicle may be leveraged for diagnosing conditions of the AEMs, including whether the AEMs are stuck in a dampening mode, stuck in a stiffening mode, or functioning as desired. Furthermore, in this way, the condition of the AEMs may be diagnosed even if the vehicle is unoccupied. Additionally, engine operation may be adjusted responsive to conditions where the AEMs are degraded (e.g., stuck in a stiffening mode or stuck in a dampening mode). For example, should the AEMs be stuck in a stiffening mode, the engine idle speed may be increased to reduce vibration issues.

The technical effect is to recognize that the onboard cameras of the vehicle may be utilized for diagnosing conditions of the AEMs without the use of additional or specialized sensors. In particular, a technical effect is to recognize that an amount of noise in images captured by the onboard cameras of the vehicle during induced vibration conditions with the AEMs commanded to a stiffening mode and commanded to dampening mode may be utilized to determine whether the AEMs are functioning as desired. Furthermore, such an approach may also be utilized to determine a specific degradation condition of the AEMs, such as whether the AEMs are stuck in a dampening mode or a stiffening mode. Thus, specific diagnoses may be made and, in some cases, engine operating adjustments may be tailored to the specific diagnoses to avoid unwanted NVH.

The systems discussed herein, and with regards to FIGS. 1-5, along with the methods described herein, and with regard to FIGS. 6-13, may enable one or more systems and one or more methods. In one example, a method comprises, during a stopped condition of the vehicle, commanding stiffening and dampening modes of an active engine mount (AEM) system while inducing vehicle vibrations and recording images, and indicating a condition of the AEM system based on the recorded images. In a first example of the method, the condition of the AEM system includes one of the AEM system being stuck in the dampening mode, stuck in the stiffening mode, or functioning as expected or desired. A second example of the method optionally includes the first example, and further includes wherein the images are recorded via an onboard camera, the onboard camera transitioned from a first setting to a second setting prior to recording of the images, and wherein the onboard camera is controlled in second setting of operation during recording of the images. A third example of the method optionally includes any one or more or each of the first through second examples, and further includes wherein the vehicle vibrations are periodic vehicle vibrations induced by operating an engine of the vehicle with fuel shut-off to at least one engine cylinder of the engine. A fourth example of the method optionally includes any one or more or each of the first through third examples, and further includes wherein the vehicle is indicated to be unoccupied during the stopped condition. A fifth example of the method optionally includes any one or more or each of the first through fourth examples, and further comprises activating a brake of the vehicle during the stopped condition. A sixth example of the method optionally includes any one or more or each of the first through fifth examples, and further includes wherein indicating the condition of the AEM system includes illuminating a malfunction indicator light. A seventh example of the method optionally includes any one or more or each of the first through sixth examples, and further includes wherein the indicating is based on an amount of noise between the recorded images and a set of baseline images acquired during the stopped condition prior to commanding the stiffening and dampening modes. An eighth example of the method optionally includes any one or more or each of the first through seventh examples, and further comprises adjusting an engine idle speed based on the condition of the AEM system.

Another example method comprises, during a stopped condition of the vehicle, operating an engine of the vehicle at idle while recording images via an onboard camera of the vehicle to obtain a baseline image, commanding fuel shut off to an engine cylinder of the engine in order to induce misfires at the engine cylinder, capturing one or more test images via the onboard camera at a predetermined time following each induced misfire while commanding an active engine mount (AEM) system to a dampening mode and then to a stiffening mode, followed by commanding the AEM system back to the dampening mode, and updating a condition of the AEM system based on an amount of camera image noise between the baseline image and the images recorded while operating the engine with fuel shut-off to the engine cylinder. A second example of the method optionally includes the first method and further includes wherein the AEM system is diagnosed as being stuck in the dampening mode responsive to the amount of camera image noise staying below a noise threshold when the AEM system is commanded to the stiffening mode. A third example of the method optionally includes any one or more or each of the first through second examples, and further includes wherein the AEM system is diagnosed as being stuck in the stiffening mode responsive to the amount of camera image noise increasing above a noise threshold when the AEM system is commanded to the dampening mode. A fourth example of the method optionally includes any one or more or each of the first through third examples, and further includes wherein settings of the camera are the same when forming the baseline image and when recording images while operating the engine with fuel shut-off to the engine cylinder. A fifth example of the method optionally includes any one or more or each of the first through fourth examples, and further includes wherein the predetermined time is based on a predicted peak amount of vibration following each misfire. A sixth example of the method optionally includes any one or more of the first through fifth examples, and further comprises controlling an engine speed while inducing the misfires at the engine cylinder.

An example system comprises, an engine, an active engine mount (AEM) system coupling the engine to a vehicle, a vehicle camera system, and a controller with computer readable instructions stored on non-transitory memory that when executed, cause the controller to, during a vehicle stopped condition, command stiffening and dampening modes of the AEM system while inducing misfire events and intermittently recording images via the vehicle camera system, and indicate a condition of the AEM system based on the intermittently recorded images. A second example of the system optionally includes the first example system, and further comprises instructions which cause the controller to update an engine idle speed based on the indicated condition of the AEM system. A third example of the system optionally includes any one or more or each of the first example through second example systems, and further includes, wherein the vehicle camera system includes a first camera and a second camera, and wherein the recorded images and the baseline image are based on image data captured by the first camera. A fourth example of the system optionally includes any one or more or each of the first example through third example systems, and further includes wherein indicating the condition of the AEM system based on the recorded images includes illuminating a diagnostic light. A fifth example of the system optionally includes any one or more or each of the first example through fourth example systems, and further includes wherein the vehicle vibrations are induced by operating the engine in a fuel shut-off mode.

Note that the example control and estimation routines included herein can be used with various engine and/or vehicle system configurations. The control methods and routines disclosed herein may be stored as executable instructions in non-transitory memory and may be carried out by the control system including the controller in combination with the various sensors, actuators, and other engine hardware. The specific routines described herein may represent one or more of any number of processing strategies such as event-driven, interrupt-driven, multi-tasking, multi-threading, and the like. As such, various actions, operations, and/or functions illustrated may be performed in the sequence illustrated, in parallel, or in some cases omitted. Likewise, the order of processing is not necessarily required to achieve the features and advantages of the example embodiments described herein, but is provided for ease of illustration and description. One or more of the illustrated actions, operations and/or functions may be repeatedly performed depending on the particular strategy being used. Further, the described actions, operations and/or functions may graphically represent code to be programmed into non-transitory memory of the computer readable storage medium in the engine control system, where the described actions are carried out by executing the instructions in a system including the various engine hardware components in combination with the electronic controller.

It will be appreciated that the configurations and routines disclosed herein are exemplary in nature, and that these specific embodiments are not to be considered in a limiting sense, because numerous variations are possible. For example, the above technology can be applied to V-6, I-4, I-6, V-12, opposed 4, and other engine types. The subject matter of the present disclosure includes all novel and non-obvious combinations and sub-combinations of the various systems and configurations, and other features, functions, and/or properties disclosed herein.

As used herein, the term "approximately" is construed to mean plus or minus five percent of the range unless otherwise specified.

The following claims particularly point out certain combinations and sub-combinations regarded as novel and non-obvious. These claims may refer to "an" element or "a first" element or the equivalent thereof. Such claims should be understood to include incorporation of one or more such elements, neither requiring nor excluding two or more such elements. Other combinations and sub-combinations of the disclosed features, functions, elements, and/or properties may be claimed through amendment of the present claims or through presentation of new claims in this or a related application. Such claims, whether broader, narrower, equal, or different in scope to the original claims, also are regarded as included within the subject matter of the present disclosure.

The invention claimed is:

1. A method for a vehicle, comprising:
during a stopped condition of the vehicle,
commanding stiffening and dampening modes of an active engine mount (AEM) system while inducing vehicle vibrations and recording images; and
indicating a condition of the AEM system based on the recorded images.

2. The method of claim 1, where the condition of the AEM system includes one of the AEM system being stuck in the dampening mode, stuck in the stiffening mode, or functioning as expected or desired.

3. The method of claim 1, wherein the images are recorded via an onboard camera, the onboard camera transitioned from a first setting to a second setting prior to recording of the images, and wherein the onboard camera is controlled in the second setting of operation during recording of the images.

4. The method of claim 1, wherein the vehicle vibrations are periodic vehicle vibrations induced by operating an engine of the vehicle with fuel shut-off to at least one engine cylinder of the engine.

5. The method of claim 1, wherein the vehicle is indicated to be unoccupied during the stopped condition.

6. The method of claim 5, further comprising activating a brake of the vehicle during the stopped condition.

7. The method of claim 1, wherein indicating the condition of the AEM system includes illuminating a malfunction indicator light.

8. The method of claim 1, wherein the indicating is based on an amount of noise between the recorded images and a set of baseline images acquired during the stopped condition prior to commanding the stiffening and dampening modes.

9. The method of claim 1, further comprising adjusting an engine idle speed based on the condition of the AEM system.

10. A method for a vehicle, comprising:
during a stopped condition of the vehicle,
operating an engine of the vehicle at idle while recording images via an onboard camera of the vehicle to obtain a baseline image;
commanding fuel shut off to an engine cylinder of the engine in order to induce misfires at the engine cylinder;
capturing one or more test images via the onboard camera at a predetermined time following each induced misfire while commanding an active engine mount (AEM) system to a dampening mode and then to a stiffening mode, followed by commanding the AEM system back to the dampening mode; and
updating a condition of the AEM system based on an amount of camera image noise between the baseline image and the images recorded while operating the engine with fuel shut-off to the engine cylinder.

11. The method of claim 10, wherein the AEM system is diagnosed as being stuck in the dampening mode responsive to the amount of camera image noise staying below a noise threshold when the AEM system is commanded to the stiffening mode.

12. The method of claim 10, wherein the AEM system is diagnosed as being stuck in the stiffening mode responsive to the amount of camera image noise increasing above a noise threshold when the AEM system is commanded to the dampening mode.

13. The method of claim 10, wherein settings of the camera are the same when forming the baseline image and when recording images while operating the engine with fuel shut-off to the engine cylinder.

14. The method of claim 10, wherein the predetermined time is based on a predicted peak amount of vibration following each misfire.

15. The method of claim 10, further comprising controlling an engine speed while inducing the misfires at the engine cylinder.

16. A system, comprising:
an engine;
an active engine mount (AEM) system coupling the engine to a vehicle;
a vehicle camera system; and
a controller with computer readable instructions stored on non-transitory memory that when executed, cause the controller to:
during a vehicle stopped condition,
command stiffening and dampening modes of the AEM system while inducing misfire events and intermittently recording images via the vehicle camera system; and
indicate a condition of the AEM system based on the intermittently recorded images.

17. The system of claim 16, further comprising instructions which cause the controller to update an engine idle speed based on the indicated condition of the AEM system.

18. The system of claim 16, wherein the vehicle camera system includes a first camera and a second camera, and wherein the recorded images and the baseline image are based on image data captured by the first camera.

19. The system of claim 18, wherein indicating the condition of the AEM system based on the recorded images includes illuminating a diagnostic light.

20. The system of claim 16, wherein the vehicle vibrations are induced by operating the engine in a fuel shut-off mode.

* * * * *